(12) United States Patent
Hiel et al.

(10) Patent No.: US 7,368,162 B2
(45) Date of Patent: *May 6, 2008

(54) ALUMINUM CONDUCTOR COMPOSITE CORE REINFORCED CABLE AND METHOD OF MANUFACTURE

(75) Inventors: Clem Hiel, Rancho Palos Verdes, CA (US); George Korzienowski, Woodland Hills, CA (US)

(73) Assignee: CTC Cable Corporation, Irvine, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 10/511,881

(22) PCT Filed: Apr. 23, 2003

(86) PCT No.: PCT/US03/12520

§ 371 (c)(1),
(2), (4) Date: Oct. 19, 2004

(87) PCT Pub. No.: WO03/091008

PCT Pub. Date: Nov. 6, 2003

(65) Prior Publication Data

US 2005/0227067 A1  Oct. 13, 2005

Related U.S. Application Data

(60) Provisional application No. 60/374,879, filed on Apr. 23, 2002.

(51) Int. Cl.
*B32B 27/04* (2006.01)
*H02G 3/00* (2006.01)

(52) U.S. Cl. .............. 428/300.7; 428/297.4; 428/299.4; 428/299.1; 428/298.1; 428/300.4; 174/70 R; 174/102 R; 174/106 R; 174/113 C

(58) Field of Classification Search ............ 428/291.4, 428/298.1, 299.4, 299.1, 300.4, 300.7, 301.4; 174/70 R, 102 R, 106 R, 113 C; 427/384, 427/372.2, 430.1, 434.2, 434.6

See application file for complete search history.

(56) References Cited

U.S. PATENT DOCUMENTS 3,331,919 A 7/1967 Vayson (Continued)

FOREIGN PATENT DOCUMENTS

| EP | 0346499 B1 | 5/1995 |
|----|------------|--------|
| EP | 1124235 A2 | 8/2001 |
| EP | 1168374 A2 | 1/2002 |
| JP | 1126388 A  | 9/1999 |
| WO | WO03/050825 A1 | 6/2003 |

OTHER PUBLICATIONS

Sucuma P. Elliot, "HECO puts new composite conductors to the test", Tranmission and Distribution World, Jun. 1, 2003.

(Continued)

*Primary Examiner*—Jill Gray
(74) *Attorney, Agent, or Firm*—Brownstein Hyatt Farber Schreck, LLP

(57) ABSTRACT

This invention relates to an aluminum conductor composite core reinforced cable (ACCC) and method of manufacture. An ACCC cable having a composite core surrounded by at least one layer of aluminum conductor. The composite core comprises at least one longitudinally oriented substantially continuous reinforced fiber type in a thermosetting resin matrix having an operating temperature capability within the range of about 90 to about 230° C., at least 50% fiber volume fraction, a tensile strength in the range of about 160 to about 240 Ksi, a modulus of elasticity in the range of about 7 to about 30 Msi and a thermal expansion coefficient in the range of about 0 to about $6\times10^{-6}$ m/m/C. According to the invention, a B-stage forming process may be used to form the composite core at improved speeds over pultrusion processes wherein the speeds ranges from about 9 ft/min to about 50 ft/min.

36 Claims, 11 Drawing Sheets

U.S. PATENT DOCUMENTS

| | | |
|---|---|---|
| 3,692,924 A | 9/1972 | Nye |
| 3,717,720 A | 2/1973 | Spellman |
| 3,808,078 A | 4/1974 | Snellman |
| 3,973,385 A | 8/1976 | Roe |
| 4,059,951 A | 11/1977 | Roe |
| RE32,374 E | 3/1987 | Dey |
| 4,763,981 A | 8/1988 | Wilkins |
| 4,961,990 A | 10/1990 | Yamada |
| 5,122,622 A | 6/1992 | Reuss |
| 5,198,621 A | 3/1993 | Kojima |
| 5,222,173 A | 6/1993 | Bausch |
| 5,296,456 A | 3/1994 | Shiga |
| 5,561,729 A | 10/1996 | Parris |
| 5,651,081 A | 7/1997 | Blew |
| 5,847,324 A | 12/1998 | Farquhar |
| 5,917,977 A | 6/1999 | Barrett |
| 6,180,232 B1 | 1/2001 | McCullough |
| 6,245,425 B1 | 6/2001 | McCullough |
| 6,270,856 B1 | 8/2001 | Hendewerk |
| 6,344,270 B1 | 2/2002 | McCullough |
| 6,423,808 B1 | 7/2002 | Watanabe |
| 6,447,927 B1 | 9/2002 | McCullough |
| 6,463,198 B1 | 10/2002 | Coleman |
| 6,528,729 B1 | 3/2003 | Kamata |
| 6,568,072 B2 | 5/2003 | Wilemon |
| 7,060,326 B2 * | 6/2006 | Hiel et al. .................. 427/384 |
| 2002/0189845 A1 | 12/2002 | Gorrell |
| 2004/0131834 A1* | 7/2004 | Hiel et al. ................ 428/292.1 |
| 2004/0131851 A1* | 7/2004 | Hiel et al. .................. 428/375 |
| 2004/0132366 A1* | 7/2004 | Hiel et al. .................... 442/43 |
| 2004/0235592 A1* | 11/2004 | McGrath et al. ............ 473/560 |
| 2005/0048273 A1* | 3/2005 | Ryan ....................... 428/297.4 |
| 2005/0051580 A1* | 3/2005 | Ramey ...................... 222/390 |
| 2005/0129942 A1* | 6/2005 | Hiel et al. .................. 428/375 |
| 2005/0186410 A1* | 8/2005 | Bryant et al. ............ 428/292.1 |
| 2005/0227067 A1* | 10/2005 | Hiel et al. .................. 428/364 |

OTHER PUBLICATIONS

Office of Industrial Technologies, "Development of a Composite-Reinforced Aluminum Conductor", Dec. 2001.

Oak Ridge National Laboratory, "Power Grid of the Future", ONRL Review, vol. 35, No. 2, 2002, web-print.

Alcoa Conductor Products Company, "T&D Conductors; Overhead; Underground; Building Wire", Jul. 1, 1989, p. 33.

* cited by examiner

ALUMINUM CONDUCTOR COMPOSITE CORE REINFORCED CABLE AND METHOD OF MANUFACTURE

CLAIM FOR PRIORITY

In relation to this International Application, applicants claim priority of earlier U.S. provisional application Ser. No. 60/374,879 filed in the United States Patent and Trademark Office on 23 Apr. 2002, the entire disclosure of which is incorporated by reference herein.

TECHNICAL FIELD

The present invention relates to an aluminum conductor composite core (ACCC) reinforced cable and method of manufacture. More particularly, to a cable for providing electrical power having a reinforced fiber thermosetting resin composite core surrounded by aluminum conductor capable of carrying increased ampacity at elevated temperatures.

BACKGROUND OF INVENTION

This invention relates to composite core members and aluminum conductor composite core (ACCC) reinforced cable products made therefrom. This invention further relates to a forming process for an aluminum conductor composite core reinforced cable (ACCC). In the traditional aluminum conductor steel reinforced cable (ACSR) the aluminum conductor transmits the power and the steel core is designed to carry the transfer load.

In an ACCC cable, the steel core of the ACSR cable is replaced by a composite core comprising at least one reinforced fiber type in a thermosetting resin matrix. Replacing the steel core has many advantages. An ACCC cable can maintain operating temperatures in the range of about 90 to about 230° C. without corresponding sag induced in traditional ACSR cables. Moreover, to increase ampacity, an ACCC cable couples a higher modulus of elasticity with a lower coefficient of thermal expansion.

This invention relates to an aluminum conductor composite core reinforced cable suitable for operation at high operating temperatures without being limited by current operating limitations inherent in other cables for providing electrical power wherein provision of electrical power includes both distribution and transmission cables. Typical ACSR cables can be operated at temperatures up to 100° C. on a continuous basis without any significant change in the conductor's physical properties related to a reduction in tensile strength. These temperature limits constrain the thermal rating of a typical 230-kV line, strung with 795 kcmil ACSR "Drake" conductor, to about 400 MVA, corresponding to a current of 1000 A.

Conductor cables are constrained by the inherent physical characteristics of the components that limit ampacity. More specifically, the ampacity is a measure of the ability to send power through the cable wherein increased power causes an increase in the conductor's operating temperature. Excessive heat causes the cable to sag below permissible levels. Therefore, to increase the load carrying capacity of transmission cables, the cable itself must be designed using components having inherent properties that withstand increased ampacity without inducing excessive sag.

Although ampacity gains can be obtained by increasing the conductor area that wraps the core of the transmission cable, increasing conductor weight increases the weight of the cable and contributes to sag. Moreover, the increased weight requires the cable to use increased tension in the cable support infrastructure. Such large load increases typically would require structure reinforcement or replacement, wherein such infrastructure modifications are typically not financially feasible. Thus, there is financial motivation to increase the load capacity on electrical transmission cables while using the existing transmission liens.

European Patent Application No. EP1168374A3 discloses a composite core comprised of a single type of reinforced glass fiber and thermoplastic resin. The object is to provide an electrical transmission cable which utilizes a reinforced plastic composite core as a load bearing element in the cable and to provide a method of carrying electrical current through an electrical transmission cable which utilizes an inner reinforced plastic core. The composite core fails in these objectives. A one fiber system comprising glass fiber does have the required stiffness to attract transfer load and keep the cable from sagging. Secondly, a composite core comprising glass fiber and thermoplastic resin does not meet the operating temperatures required for increased ampacity, namely, between 90 and 230° C.

Composite cores designed using a carbon epoxy composite core also have inherent difficulties. The carbon epoxy core has very limited flexibility and is cost prohibitive. The cable product having a carbon epoxy core does not have sufficient flexibility to permit winding and transport. Moreover, the cost for carbon fibers are expensive compared to other available fibers. The cost for carbon fibers is in the range of $5 to $37 per pound compared to glass fibers in the range of $0.36 to $1.20 per pound. Accordingly, a composite core constructed of only carbon fibers is not financially feasible.

Physical properties of composite cores are further limited by processing methods. Previous processing methods cannot achieve a high fiber/resin ratio by volume or weight. These processes do not allow for creation of a fiber rich core that will achieve the strength to compete with a steel core. Moreover, the processing speed of previous processing methods are limited by inherent characteristics of the process itself. For example, traditional pultrusion dies are approximately 36 inches, having a constant cross section. The result is increased friction between the composite and the die slowing processing time. The processing times in such systems for epoxy resins range within about 6 inches/minute to about 12 inches/minute, which is not economically feasible. Moreover, these processes do not allow for composite configuration and tuning during the process, wherein tuning comprises changing the fiber/resin ratio.

It is therefore desirable to design economically feasible ACCC cables having at least one reinforced fiber type in a thermosetting resin matrix comprising inherent physical characteristics that facilitate increased ampacity without corresponding cable sag. It is further desirable to process composite cores using a process that allows configuration and tuning of the composite cores during processing and allows for processing at speeds in the range of about 9 ft/min to 50 ft/min.

SUMMARY OF THE INVENTION

Increased ampacity can be achieved by using an aluminum conductor composite core (ACCC) reinforced cable. An ACCC reinforced cable is a high-temperature, low-sag conductor, which can be operated at temperatures above 100° C. while exhibiting stable tensile strength and creep elongation properties. It is further desirable to achieve practical temperature limits of up to 230° C. Using an ACCC reinforced cable, which has the same diameter as the original, at 180° C. also increases the line rating by 50% without any significant change in structure loads. If the replacement conductor has a lower thermal elongation rate than the original, then the support structures will not have to be raised or reinforced.

In particular, replacing the core of distribution and transmission conductor cables with a composite strength member comprising fiber and resin with a relatively high modulus of elasticity and a relatively low coefficient of thermal expansion facilitates an increased conductor cable ampacity. It is further desirable to design composite cores having long term durability allowing the composite strength member to operate at least sixty years, and more preferably seventy years at the temperatures associated with the increased ampacity, about 90 to 230° C., without having to increase either the diameter of the composite core, or the outside diameter of the conductor. This in turn allows for more physical space to put more aluminum and for the mechanical and physical performance to be able to meet the sag limits without increased conductor weight.

Further, the invention allows for formation of a composite core having a smaller core size. A smaller core size allows the conductor cable to accommodate an increased volume of aluminum wherein an ACCC cable has the same strength and weight characteristics as a conductor cable without a composite core.

To achieve the desired ampacity gains, a composite core according to the invention may also combine fibers having a low modulus of elasticity with fibers having a high modulus of elasticity for increased stiffness of the core and a lower elongation percent. By combining fibers, a new property set including different modulus of elasticity, thermal expansion, density and cost is obtained. Sag versus temperature calculations show achievable ampacity gains when an advanced composite is combined with low modulus reinforced fibers having inherent physical properties within the same range as glassfiber.

Composite cores according to the invention meet certain physical characteristics dependent upon the selection of reinforced fiber types and thermosetting resins with desired inherent physical properties. Composite cores according to the invention have substantially low thermal expansion coefficients, substantially high tensile strength, ability to withstand a substantially high range of operating temperatures, ability to withstand a low range of ambient temperatures, substantially high dielectric properties and sufficient flexibility to permit winding. In particular, composite cores according to the present invention have a tensile strength within the range of about 160 to about 240 Ksi, a modulus of elasticity within the range of about 7 to about 30 Msi, an operating temperature within the range of about 90 to about 230° C. and a thermal expansion coefficient within the range of about 0 to about $6 \times 10^{-6}$ m/m/C. These ranges can be achieved by a single reinforced fiber type or a combination of reinforced fiber types. Theoretically, although the characteristics could be achieved by a single fiber type alone, from a practical point of view, most cores within the scope of this invention comprise two or more distinct reinforced fiber types. In addition, depending on the physical characteristics desired in the final composite core, the composite core accommodates variations in the relative amounts of fibers.

Composite cores of the present invention can be formed by a B-stage forming process wherein fibers are wetted with resin and continuously pulled through a plurality of zones within the process. The B-stage forming process relates generally to the manufacture of composite core members and relates specifically to an improved apparatus and process for making resin impregnated fiber composite core members. More specifically, according to a preferred embodiment, a multi-phase B-stage process forms a composite core member from fiber and resin with superior strength, higher ampacity, lower electrical resistance and lighter weight than previous core members. The process enables formation of composite core members having a fiber to resin ratio that maximizes the strength of the composite, specifically flexural, compressive and tensile strength. In a further embodiment, the composite core member is wrapped with high conductivity aluminum resulting in an ACCC cable having high strength and high stiffness characteristics.

BRIEF DESCRIPTION OF THE DRAWINGS

These and other features of the invention are best understood by referring to the detailed description of the invention, read in light of the accompanying drawings, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 11:
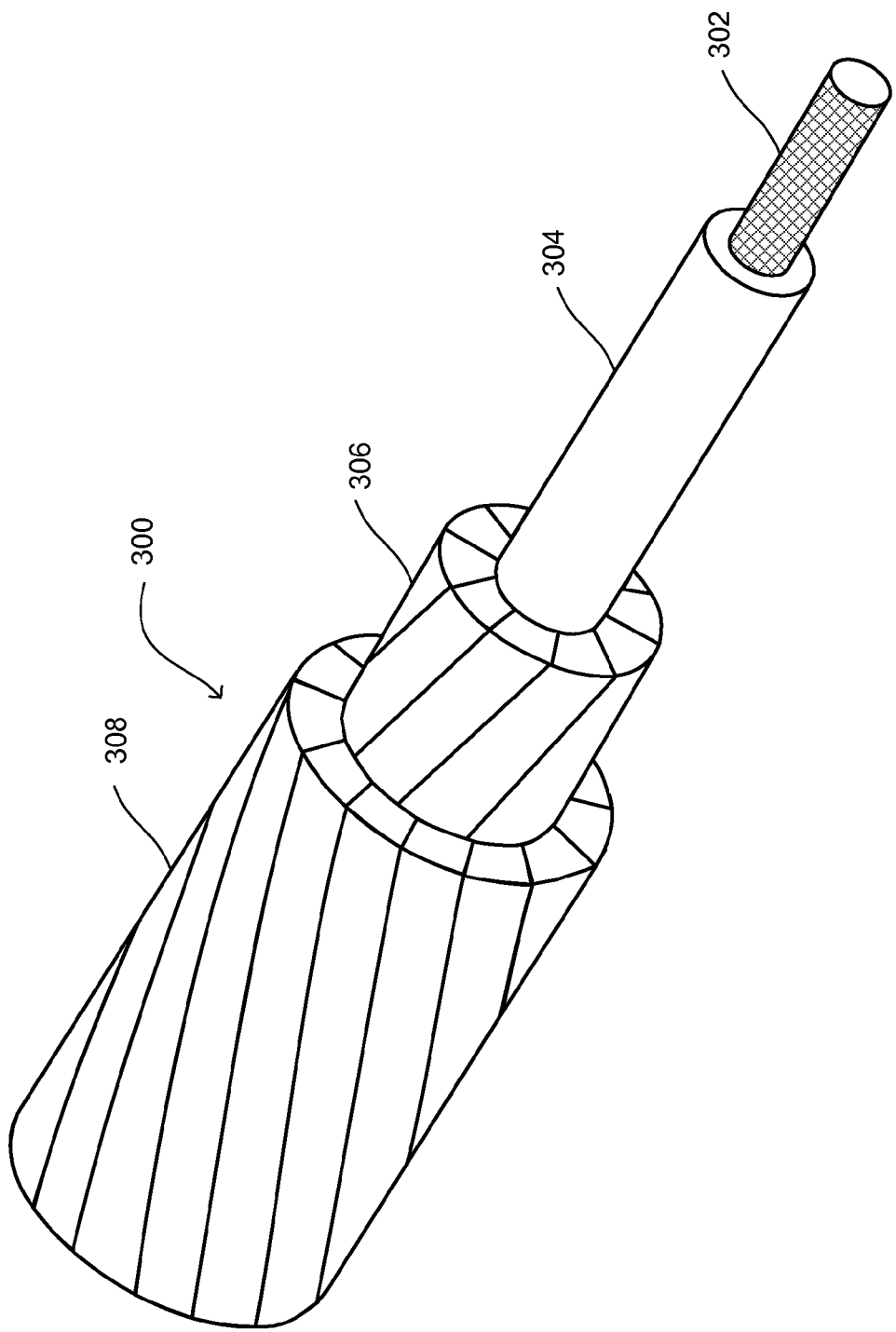
FIG. 11 is a schematic view of one embodiment of an aluminum conductor composite core (ACCC) reinforced cable showing an inner advanced composite core and an outer low modulus core surrounded by two layers of aluminum conductor according to the invention.

The present invention relates to a reinforced composite core member made from reinforced fibers embedded in a high temperature resin for use in aluminum conductor composite core reinforced (ACCC) cables to provide for electrical power distribution wherein electrical power distribution includes distribution and transmission cables. FIG. 11 illustrates a typical embodiment of an ACCC reinforced cable 300. FIG. 11 illustrates an ACCC reinforced cable having a reinforced carbon fiber/epoxy resin composite inner core 302 and a reinforced glass fiber/epoxy resin composite outer core 304, surrounded by a first layer of aluminum conductor 306 wherein a plurality of trapezoidal shaped aluminum strands wrap around the composite core and having a second layer of aluminum conductor 308 wherein a plurality of trapezoidal shaped aluminum strands wrap around the first aluminum layer 306.

Composite cores of the present invention comprise the following characteristics: at least one type of reinforced fiber, variable relative amounts of each reinforced fiber type, reinforced fiber types of substantially small diameter, reinforced fiber types of a substantially continuous length, composite cores having a high packing density, reinforced fiber tows having relative spacing within the packing density, a volume fraction at least 50%, a fiber weight fraction between about 60 and about 75%, adjustable volume fraction, substantially low thermal expansion coefficient, a substantially high tensile strength, ability to withstand a substantially high range of operating temperatures, ability to withstand substantially low ambient temperature, having the potential to customize composite core resin properties, substantially high dielectric properties, having the potential of a plurality of geometric cross section configurations, and sufficient flexibility to permit winding of continuous lengths of composite core.

A composite core of the following invention has a tensile strength in the range of about 160 to about 240 Ksi, a modulus of elasticity in the range of about 7 to about 30 Msi, an operating temperature in the range of about 90 to about 230° C. and a thermal expansion coefficient in the range of about 0 to about $6 \times 10^{-6}$ m/m/C. To achieve these physical characteristics, composite cores of the present invention can comprise one type of reinforced fiber having inherent physical properties to enable the composite core to meet the required physical specifications. From a practical point of view, most cables within the scope of this invention comprise at least two distinct reinforced fiber types.

Combining two or more reinforced fibers into the composite core member offers substantial improvements in strength to weight ratio over materials commonly used for cable in an electrical power transmission system. Fibers may be selected from the group comprising, for example: carbon fibers—both HM and HS (pitch based), Kevlar fibers, basalt fibers, glass fibers, Aramid fibers, boron fibers, liquid crystal fibers, high performance polyethylene fibers and carbon nanofibers. Several types of carbon, boron, Kevlar and glass fibers are commercially available. Each fiber type has subtypes of varying characteristics that may be combined in various combinations in order to achieve a particular composite. It is noted that these are only examples of fibers that meet the specified characteristics of the invention, such that the invention is not limited to these fibers only. Other fibers meeting the required physical characteristics of the invention may be used.

Composite cores of the present invention preferably comprise fiber tows having relatively small yield or K numbers. A fiber tow is an untwisted bundle of continuous microfibers wherein the composition of the tow is indicated by its yield or K number. For example, 12K tow has 12,000 individual microfibers. Ideally, microfibers wet out with resin such that the resin coats the circumference of each microfiber within the bundle or tow. Wetting may be affected by tow size, that is, the number of microfibers in the bundle, and individual microfiber size. Larger tows create more difficulty wetting around individual fibers in the bundle due to the number of fibers contained within the bundle whereas smaller fiber diameter increases the distribution of resin around each fiber within each fiber tow. Wetting and infiltration of the fiber tows in composite materials is of critical importance to performance of the resulting composite. Incomplete wetting results in flaws or dry spots within the fiber composite reducing strength and durability of the composite product. Fiber tows may also be selected in accordance with the size of fiber tow that the process can handle in order to enable forming a composite having optimal desired physical characteristics. One process for forming composite cores in accordance with the present invention is called B-stage forming process. Fiber tows of the present invention for carbon are selected preferably in the range of about 4K to about 50K and glass fiber tows are preferably selected in the range of about 800 to about 1200 yield.

Individual reinforced fiber sizes in accordance with the present invention preferably are within the range of about 8 to about 15 µm for glass fibers and most preferably about 10 µm in diameter whereas carbon fibers are preferably in the range of about 5 to about 10 µm and most preferably about 7 µm in diameter. For other types of fibers a suitable size range is determined in accordance with the desired physical properties. The ranges are selected based on optimal wet-out characteristics and feasibility. For example, fibers less than about 5 µm are so small in diameter that they pose certain health risks to those that handle the fibers. On the other end, fibers approaching 25 µm in diameter are difficult to work with because they are stiffer and more brittle.

Composite cores of the present invention comprise fiber tows that are substantially continuous in length. In practice, carbon fiber tows comprising the present invention are preferably between about 1000 and 3000 meters in length, depending on the size of the spool. However, glass fiber lengths can range up to 36 km depending on the size of the spool. Most preferably, fibers are selected in the range of 1000 to 33,000 meters. It is most preferable to select the longest fibers that the processing equipment will accommodate due to less splicing of fibers to form a continuous composite core in excess of 6000 feet. Fiber ends may be glued end-to-end forming a substantially continuous fiber tow length. Continuous towing orients the fibers longitudinally along the cable.

Composite cores of the present invention comprise fibers having a high packing efficiency relative to other conductor cable cores. In particular, traditional steel conductor cables generally comprise several round steel wires. Due to the round shape of the wires, the wires cannot pack tightly together and can only achieve a packing efficiency of about 74%. The only way that a steel core could have 100% packing efficiency would be to have a solid steel rod as opposed to several round steel wires. This is not possible because the final cable would be to stiff and would not bend. In the present invention, individual fibers are oriented longitudinally, wherein each fiber is coated with resin. and cured forming a hybridized composite core member having 100% packing efficiency. Higher packing efficiency yields a composite strength that is greater for a given volume relative to other cables. In addition, higher packing efficiency allows for formation of a composite core of smaller diameter thereby increasing the amount of aluminum conductor material capable of wrapping around the composite conductor core.

Composite cores of the present invention comprise reinforced fibers that are substantially heat resistant. Heat resistance enables an ACCC cable to transmit increased power due to the ability of the composite core to withstand higher operating temperatures. The fibers used in the present invention have the ability to withstand operating temperatures between the range of about 90 and about 230° C. Most preferably, the fibers in the present invention have the ability to withstand operating temperatures between the range of about 170 to 200° C. Moreover, fibers used in the present invention can preferably withstand an ambient temperature range between about −40 to about 90° C. That is, under ambient conditions with no current flowing in an ACCC cable, the composite core is able to withstand temperatures as low as about −40° C. without suffering impairment of physical characteristics.

Relative amounts of each type of reinforced fiber varies depending on the desired physical characteristics of the composite cable. For example, fibers having a lower modulus of elasticity enable formation of a high strength, stiff composite core. Carbon fibers have a modulus of elasticity preferably in the range of about 22 to about 37 Msi whereas glassfibers are considered low modulus reinforced fibers The two types of fibers may be combined to take advantage of the inherent physical properties of each fiber to create a high strength, high stiffness composite core with added flexibility. In one embodiment, for example, the composite core comprises an inner carbon/resin core having an area of 0.037 sq. in. and a fiber resin ratio of about 70/30 by weight and an outer glass/epoxy layer having an area of 0.074 sq. in. and a fiber/resin ratio of about 75/25 by weight.

In accordance with the present invention, the physical characteristics of the composite core may be adjusted by adjusting the fiber/resin ratio of each component. Alternatively, the physical characteristics of the composite core may be adjusted by adjusting the area percentage of each component within the composite core member. For example, by reducing the total area of carbon from 0.037 sq. in. and increasing the area of glass from 0.074 sq. in., the composite core member product has reduced stiffness in the carbon core coupled with increased flexibility. In addition, due to the smaller tow diameter of glass compared to carbon, the resulting composite core is smaller in diameter enabling increased conductor for the same resulting cable size. Alternatively, a third fiber, for example basalt, may be introduced into the composite core. The additional fiber changes the physical characteristics of the end product. For example, by substituting basalt for some carbon fibers, the core has increased dielectric properties and a relative decrease in core stiffness.

Composite cores of the present invention comprise reinforced fibers having relatively high tensile strength. The degree of sag in an overhead voltage power transmission cable varies as the square of the span length and inversely with the tensile strength of the cable such that an increase in the tensile strength effectively reduces sag in an ACCC cable. Carbon fibers are selected having a tensile strength preferably in the range of about 350 to about 750 Ksi. More preferably in the range between 710 Ksi to 750 Ksi. Glassfibers are selected having a tensile strength preferably in the range of about 180 to about 220 Ksi. The tensile strength of the composite is enhanced by combining glassfibers having a lower tensile strength with carbon fibers having a higher tensile strength. The properties of both types of fibers are combined to form a new cable having a more desirable set of physical characteristics.

Composite cores of the present invention comprise longitudinal fibers embedded within a resin matrix having a fiber/resin volume fraction in a ratio of at least 50:50%. The volume fraction is the area of fiber divided by the total area of the cross section wherein the weight of the fiber will determine the final percentage ratio by weight. In accordance with the invention, preferably the volume fraction of fiber in the fiber/resin composite is within the range of about 50 to about 57% by value. Most preferably, the volume fraction is calculated to yield a fiber/resin ratio of 72% by weight depending on the weight of the fiber.

In accordance with the present invention, the composite core is designed based on the desired physical characteristics of an ACCC reinforced cable. More preferably, the composite core is designed having an inner strengthening core member comprising an advanced composite surrounded by an outer more flexible layer. An advanced composite is a composite having continuous fibers having a greater than 50% volume fraction and mechanical properties exceeding the mechanical properties of glassfibers. Further, it is preferable to have an outer layer low modulus composite having mechanical properties in the range of glass fiber. A low modulus fiber has mechanical characteristics in the range of glass fiber. The mechanical properties of glass fibers accommodate splicing whereas the advanced composite is more brittle and does not undertake splicing well.

Fibers forming an advanced composite are selected preferably having a tensile strength in the range of about 350 to about 750 Ksi; a modulus of elasticity preferably in the range of about 22 to about 37 Msi; a coefficient of thermal expansion in the range of about −0.7 to about 0 m/m/C; yield elongation percent in the range of about 1.5 to 3%; dielectric properties in the range of about 0.31 W/m·K to about 0.04 W/m·K and density in the range of about 0.065 lb/in$^3$ to about 0.13 lb/in$^3$.

Fibers forming the outer low modulus layer surrounding the advanced composite preferably have a tensile strength in the range within about 180 to 220 Ksi; a coefficient of thermal expansion in the range of about $5 \times 10^{-6}$ to about $10 \times 10^{-6}$ m/m/C; yield elongation percent in the range of about 3 to about 6%; and dielectric properties in the range of about 0.034 to about 0.04 W/m·K and density in the range of about 0.065 to about 0.13 lbs/in$^3$.

A composite core member having an inner core comprising an advanced composite in accordance with the preferred ranges of values set forth above surrounded by an outer low modulus layer in accordance with the preferred ranges of values set forth above, has increased ampacity over other conductor cables by about 0 to about 200%. In particular, the final composite core has the following preferable physical characteristics. Tensile strength in the range within about 160 to about 240 Ksi. More preferably, having tensile strength of about 185 Ksi. Modulus of elasticity preferably in the range of within about 7 to about 30 Msi. More preferably, having a modulus of elasticity of about 14 Msi.

Operating temperature in the range within about 90 to about 230° C. More preferably, the composite core is able to withstand operating temperatures at least about 190° C. Thermal expansion coefficient within the range of about 0 to about $6\times10^{-6}$ m/m/C. More preferably, the core thermal expansion coefficient is about $2.5\times10^{-6}$ m/m/C.

Preferably, particular combinations of reinforced fibers are selected based on the reinforced fiber's inherent physical properties in order to produce a composite core product having particular physical properties. In particular, to design an ACCC cable able to withstand ampacity gains, the composite core comprises both a higher modulus of elasticity and a lower coefficient of thermal expansion. The fibers preferably are not conductive but have high dielectric properties. An ACCC cable operates at higher operating temperatures without a corresponding increase in sag. Sag versus temperature calculations require input of modulus of elasticity, thermal expansion coefficient, weight of the composite strength member and conductor weight. Accordingly, these physical characteristics are taken into account in designing the composite core.

While it is preferable to form a composite core having an inner advanced composite surrounded by a low modulus composite, it is feasible to make a composite core comprising interspersed high modulus of elasticity fibers and low modulus of elasticity fibers. Depending on the strain:failure ratio, this type of core may have to be segmented in order to achieve an appropriate degree of winding. Moreover, the composite core is designed having the fiber of increased modulus of elasticity in the inner core surrounded by a fiber having a lower modulus of elasticity due to the decreased degree of strain on the inner core.

For example, carbon is selected for high modulus of elasticity in the range of about 22 to about 37 Msi, low thermal expansion coefficient in the range of about –0.7 to about 0 m/m/C, and elongation percent in the range of about 1.5 to about 3%. Glassfibers are selected for low modulus of elasticity, low thermal expansion coefficient in the range of about $5\times10^{-6}$ to about $10\times10^{-6}$ m/m/C and elongation percent in the range of about 3 to about 6%. The strain capability of the composite is tied in with the inherent physical properties of the components and the volume fraction of components. After the fiber/resin composite is selected, the strain to failure ratio of each fiber/resin composite is determined. In accordance with the present invention, the resins can be customized to achieve certain properties for processing and to achieve desired physical properties in the end product. As such, the fiber/customized resin strain to failure ratio is determined. For example, carbon/epoxy has a strain to failure ratio of 2.1% whereas glassfiber/epoxy has a strain to failure ratio of 1.7%. Accordingly, the composite core is designed having the stiffness of the carbon/epoxy in the inner core and the more flexible glassfiber/epoxy in the outer core to create a composite core with the requisite flexibility and low thermal expansion coefficient.

Alternatively, another advanced composite having mechanical properties in excess of glassfiber could be substituted for at least a portion of the carbon fibers and another fiber having the mechanical property range of glassfiber could be substituted for glassfiber. For example, basalt has the following properties: high tensile strength in the range of about 701.98 Ksi (compared to the range of about 180 to about 500 Ksi for glassfibers), high modulus of elasticity in the range of about 12.95 Msi, low thermal expansion coefficient in the range of about 8.0 ppm/C (compared to about 5.4 ppm/C for glassfibers), and elongation percent in the range of about 3.15% (compared the range of about 3 to about 6% for glassfibers). The basalt fibers provide increased tensile strength, a modulus of elasticity between carbon and glassfiber and an elongation % close to that of carbon fibers. A further advantage is that basalt has superior dielectric properties to carbon. Preferably, the composite core comprises an inner strength member that is non-conductive. By designing an advanced composite core having fibers of inherent physical characteristics surrounded by low modulus fiber outer core, a new property set for the composite core is obtained.

Sag versus temperature is determined by considering the modulus of elasticity, the thermal expansion coefficient, the weight of the composite strength member, and the conductor weight. The higher modulus of elasticity and lower coefficient of thermal expansion in the resulting composite core enables an ACCC cable to withstand ampacity gains and operating temperatures between about 90 to about 230° C.

The composite core of the present invention comprises thermosetting resins having physical properties that are adjustable to achieve the objects of the present invention. Depending on the intended cable application, suitable thermosetting resins are selected as a function of the desired cable properties to enable the composite core to have long term durability at high temperature operation. Suitable thermosetting resins may also be selected according to the process for formation of the composite core in order to minimize friction during processing, increase process speed and preferable viscosity to achieve the appropriate fiber/resin ratio in the final composite core.

The composite core of the present invention comprises resins having good mechanical properties and chemical resistance at prolonged exposure for at least about 60 years of usage. More preferably, the composite core of the present invention comprises resins having good mechanical properties and chemical resistance at prolonged exposure for at least about 70 years of usage. Further, the composite core of the present invention comprises resins that operate preferably within the range of about 90 to about 230° C. More preferably, the resin operates within the range of about 170 to about 200° C.

The composite core of the present invention comprises a resin that is tough enough to withstand splicing operations without allowing the composite body to crack. An essential element of the present invention is the ability to splice the composite core member in the final cable product. The composite core of the present invention comprises resin having a neat resin fracture toughness preferably within the range of about 0.87 INS-lb/in to about 1.24 INS-lb/in.

The composite core of the present invention comprises a resin having a low coefficient of thermal expansion. A low coefficient of thermal expansion reduces the amount of sag in the resulting cable. A resin of the present invention preferably operates in the range of about $15\times10^{-6}$ C and about $42\times10^{-6}$ C. The composite core of the present invention comprises a resin having an elongation greater than about 4.5%.

A composite core of the present invention comprises fibers embedded in a high temperature resin having at least a 50% volume fraction. The fiber to resin ratio affects the physical properties of the composite core member. In particular, the strength, electrical conductivity, and coefficient of thermal expansion are functions of the fiber volume of the composite core. Generally, the higher the volume fractions of fibers in the composite, the higher the tensile strength for the resulting composite. A fiber to resin volume fraction of the present invention preferably is within the range of about 50 to 57% corresponding to preferably within about 62 to about 75% by weight. More preferably, the fiber/resin ratio in the present invention is about 65 to about 72% by weight. Most preferably, the fiber volume fraction in the present invention meets or exceeds about 72% by weight.

Each fiber type of the composite core may have a different fiber/resin ratio by weight relative to the other fibers. This is accomplished by selecting the appropriate number of each fiber type and the appropriate resin type to achieve the desired ratio. For example, a composite core member having a carbon/epoxy inner core surrounded by an outer glass/epoxy layer may comprise 126 spools of glass fiber and epoxy resin having a viscosity of about 2000 to about 6000 cPs at 50° C. which yields a pre-determined fiber/resin ratio of about 75/25 by weight. Preferably, the resin may be tuned to achieve the desired viscosity for the process. The composite may also have 16 spools of carbon fiber and epoxy resin having a viscosity of about 2000 to about 6000 cPs at 50° C. which yields a predetermined fiber/resin ratio of about 70/30 by weight. Changing the number of spools of fiber changes the fiber/resin by weight ratio thereby changing the physical characteristics of the composite core product. Alternatively, the resin may be adjusted thereby increasing or decreasing the resin viscosity to change the fiber/resin ratio.

The composite cables made in accordance with the present invention exhibit physical properties wherein these certain physical properties may be controlled by changing parameters during the composite core forming process. More specifically, the composite core forming process is adjustable to achieve desired physical characteristics in a final ACCC cable.

In accordance with the invention, a multi-phase B-stage forming process produces a composite core member from substantially continuous lengths of suitable fiber tows and heat processable resins. In a further step, the composite core member is wrapped with high conductivity aluminum.

Figure 1:
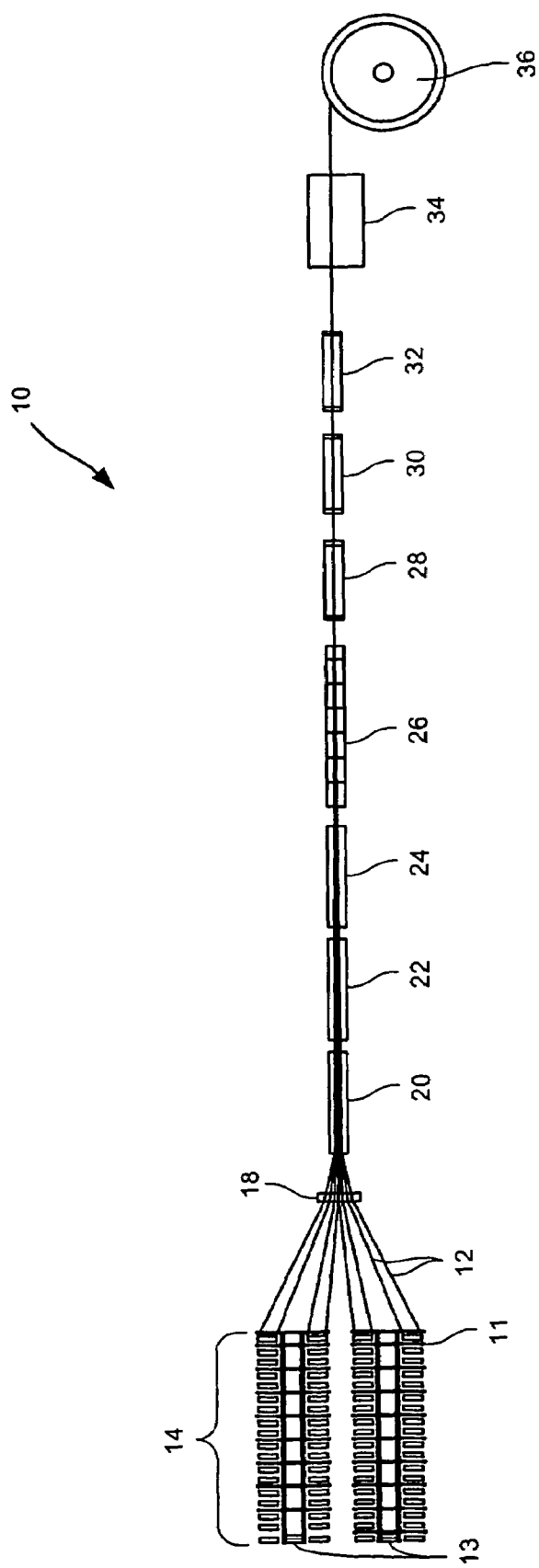
FIG. 1 is a schematic diagram of a B-stage forming process used for forming reinforced fiber composite core members in accordance with the present invention.

A process for making composite cores for ACCC cables according to the invention is described as follows. Referring to FIG. 1, the conductor core B-stage forming process of the present invention is shown and designated generally by reference number 10. The B-stage forming process 10 is employed to make continuous lengths of composite core members from suitable fiber tows or rovings and heat processable resins. The resulting composite core member comprises a hybridized concentric core having an inner and outer layer of uniformly distributed substantially parallel fibers.

In starting the operation, the pulling and winding spool mechanism is activated to commence pulling. The unimpregnated initial fiber tows extending from the exit end of the cooling portion in zone 9 serve as leaders at the beginning of the operation to pull fiber tows 12 from spools 11 through fiber tow guide 18 and the composite core processing system.

In FIG. 1, multiple spools of fiber tows 12 are contained within a rack system 14 and are provided with the ends of the individual fiber tows 12, leading from spools 11, being threaded through a fiber tow guide 18. The fibers undergo tangential pulling to prevent twisted fibers. Preferably, a pulling device 34 at the end of the apparatus pulls the fibers through the apparatus. Each dispensing rack 14 comprises a device allowing for the adjustment of tension for each spool 11. For example, each rack 14 may have a small brake at the dispensing rack to individually adjust the tension for each spool. Tension adjustment minimizes catemary and crossover of the fiber when it travels and aids in the wetting process. The tows 12 are pulled through the guide 18 and into a preheating oven 20 that evacuates moisture. The preheating oven 20 uses continuous circular air flow and a heating element to keep the temperature constant.

The tows 12 are pulled into a wet out tank 22. Wet out tank 22 is filled with resin to impregnate the fiber tows 12. Excess resin is removed from the fiber tows 12 during wet out tank 22 exit. The fiber tows 12 are pulled from the wet out tank 22 to a secondary system, B-stage oven 24. The B-stage oven heats the resin to a temperature changing the liquid stage of resin to a semi-cure stage. B-stage cure resin is in a tacky stage which permits the fiber tows 12 to be bent, changed, compressed and configured. The tackiness is controlled by manipulation of the type of resin, the fiber type, thread count and size of the fibers and temperature of the oven. Fiber tows 12 maintained separated by the guide 18, are pulled into a second B-stage oven 26 comprising a plurality of consecutive bushings to compress and configure the tows 12. In the second B-stage oven 26, the fiber tows 12 are directed through a plurality of passageways provided by the bushings. The consecutive passageways continually compress and configure the fiber tows 12 into the final uniform composite core member.

Preferably, the composite core member is pulled from the second B-stage oven 26 to a next oven processing system 28 wherein the composite core member is cured and pulled to a next cooling system 30 for cooling. After cooling, the composite core is pulled to a next oven processing system 32 for post curing at elevated temperature. The post-curing process promotes increased cross-linking within the resin matrix resulting in improved physical characteristics of the composite member. The process generally allows an interval between the heating and cooling process and the pulling apparatus 36 to cool the product naturally or by convection such that the pulling device 34 used to grip and pull the product will not damage the product. The pulling mechanism pulls the product through the process with precision controlled speed.

Referring now more particularly to FIG. 1, in a preferred embodiment, the process continuously pulls fiber from left to right of the system through a series of phases referred to herein as zones. Each zone performs a different processing function. In this particular embodiment, the process comprises 9 zones. The process originates from a series of fiber dispensing racks 14 whereby a caterpuller 34 continuously pulls the fibers 12 through each zone. One advantage to the caterpullar system is that it functions as a continuous pulling system driven by an electrical motor as opposed to the traditional reciprocation system. The caterpullar system uses a system of two belts traveling on the upper and lower portions of the product squeezing the product there between. Accordingly, the caterpuller system embodies a simplified uniform pulling system functioning at precision controlled speed using only one device instead of a multiplicity of interacting parts functioning to propel the product through the process. Alternatively, a reciprocation system may be used to pull the fibers through the process.

The process starts with zone 1. Zone 1 comprises a type of fiber dispensing system. Fibers that can be used for example are: glass fibers, carbon fibers, both HM and HS (pitch based), basalt fibers, Aramid fibers, liquid crystal fibers, Kevlar fibers, boron fibers, high performance polyethylene fibers and carbon nanofiber (CNF). In one embodiment, the fiber dispensing system comprises two racks 13 each rack containing a plurality of spools 11 containing fiber tows 12. Further, the spools 11 are interchangeable to accommodate varying types of fiber tows 12 depending on the desired properties of the composite core member.

For example, a preferred composite core member formed by the B-stage forming process comprises a carbon/resin inner core surrounded by a glass/resin outer core layer. Preferably, high strength and high quality carbon is used. The resin matrix also protects the fibers from surface damage, and prevents cracking through a mass of fibers improving fracture resistance. The conductor core B-stage forming process 10 creates a system for pulling the fibers to achieve the optimum degree of bonding between fibers in order to create a composite member with optimal composite properties.

As previously mentioned, the components of the composite core are selected based on desired composite core characteristics. One advantage of the process is the ability to adjust composite components in order for a composite core to achieve the desired goals of a final ACCC cable, namely, a cable that can carry current without undue thermal expansion causing sag and without tensile strength reduction. It is preferable to combine types of fibers to combine the physical characteristics of each. Performance can be improved by forming a core with increased strength and stiffness, coupled with a more flexible outer layer. The process increases the optimal characteristics of the composite by preventing twisting of rovings leading to more uniform wetting and strength characteristics.

For example, in a preferred embodiment of the composite core member, the composite core comprises glass and carbon. Using the B-stage forming process, the racks 13 hold 126 spools 11 of glass and 16 spools 11 of carbon. The fiber tows 12 leading from spools 11 are threaded through a fiber tow guide 18 wherein fiber tow passageways are arranged to provide a configuration for formation of a core composite member having a uniform carbon core and outer glass layer. The carbon layer is characterized by high strength and stiffness and is a weak electrical conductor whereas the outer low modulus glass layer is more flexible and non-conductive. Having an outer glass layer provides an outer insulating layer between the carbon and the high conductivity aluminum wrapping in the final composite conductor product.

The fiber dispensing system dispenses fiber tangent from the fiber package pull. Tangent pull from the spool will not twist the fiber. The center pull method will twist fibers dispensed from the spool. As such, the center pull method results in an increased number of twisted fibers. Twisted fiber will occasionally lay on top of other twisted fiber and create a composite with multiple spots of dry fiber. It is preferable to use tangent pull to avoid dry spots and optimize wet out ability of the fibers.

Figure 2:
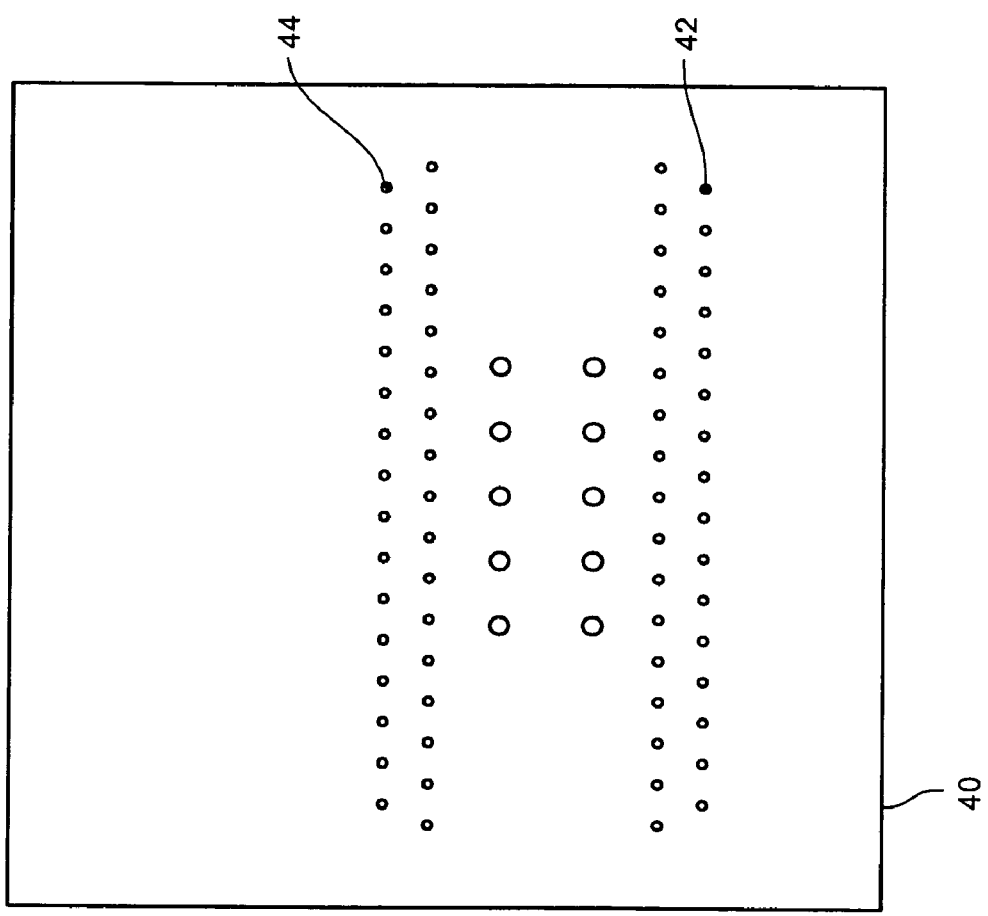
FIG. 2 is a schematic diagram of a bushing showing sufficiently spaced passageways for insertion of the fibers in a predetermined pattern to guide the fibers through the B-stage forming process in accordance with the present invention.

The fiber tows 12 are threaded through a guidance system 18. Preferably, the guide 18 comprises a polyethylene and steel bushings containing a plurality of passageways in a predetermined pattern guiding the fibers to prevent the fibers from crossing. Referring to FIG. 2, the guide comprises a bushing with sufficiently spaced passageways for insertion of the fibers in a predetermined pattern. The passageways are contained within an inner square portion 40. The passageways are arranged in rows of varying number wherein the larger diameter carbon fibers pass through the center two rows of passageways 42 and the smaller diameter glass fibers pass through the outer two rows 44 on either side of the carbon passageways 42. A tensioning device, preferably on each spool, adjusts the tension of the pulled fibers and assures the fibers are pulled straight through the guide 18.

At least two fibers are pulled through each passageway in the guide 18. For example, a guide 18 comprising 26 passageways pulls 52 fibers through, wherein each passageway has two fibers. If a fiber of a pair breaks, a sensing system alerts the composite core B-stage forming process 10 that there is a broken fiber and stops the puller 34. Alternatively, in one embodiment, a broken fiber alerts the process and the repair can be made on the fly without stopping the process depending on where the breakage occurs. To repair, a new fiber is pulled from the rack 13 and glued to the broken end of the new fiber. After the fiber is repaired, the conductor core B-stage forming machine 10 is started again.

In preferred form, the fibers are grouped in a parallel arrangement for a plurality of rows. For example, in FIG. 2, there are six parallel rows of passageways. The outer two rows comprise 32 passageways, the two inner rows comprise 31 passageways, and the two center rows comprise 4 passageways each. Fibers are pulled at least two at a time into each passageway and pulled into zone 2.

Zone 2 comprises an oven processing system that preheats the dry fibers to evacuate any moisture. The fibers of the present invention are preferably heated within the range of about 150 to 250° F. to evaporate moisture.

Figure 9:
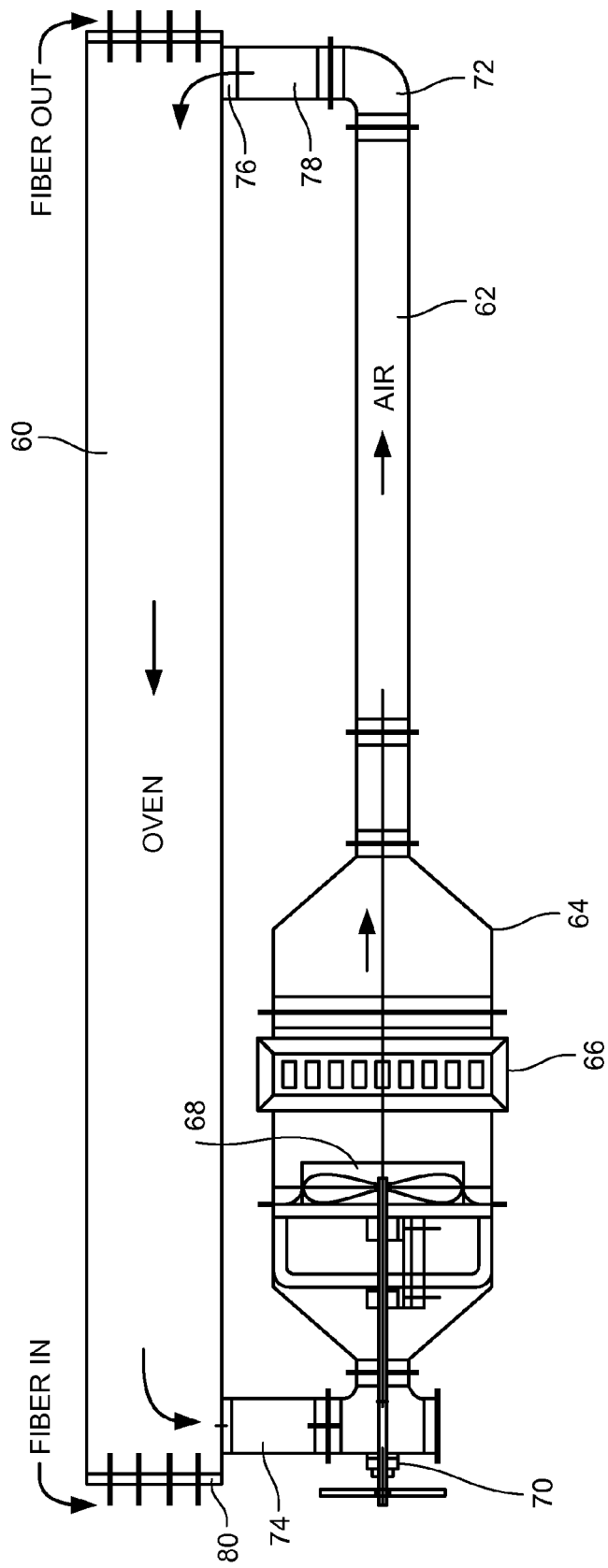
FIG. 9 is a schematic view of an oven process having cross circular air flow to keep the air temperature constant in accordance with the invention.

The oven processing system comprises an oven portion wherein the oven portion is designed to promote cross-circular air flow against the flow of material. FIG. 9 illustrates a typical embodiment of the oven system. An oven is generally designated 60. The fibers pass through the oven from upstream to downstream direction, the air passes in the reverse direction. The oven processing system comprises a heat drive system housing 64 that houses a blower 68 powered by electric motor 70 located upstream from a heater assembly 66 to circulate air in a downstream direction through air flow duct 62. The heat drive system housing houses a blower 68 upstream of the heater assembly 66. The blower 68 propels air across the heater assembly 66 and through the oven system. The air flows downstream to a curved elbow duct 72. The curved elbow duct 72 shifts air flow 90 degrees up into an inlet duct 78 and through the oven inlet 76. Through the inlet air flow shifts 90 degrees to flow upstream through the oven 60 against the pull direction of the fibers. At the end of the oven 60, the air flow shifts 90 degrees down through the oven outlet 80 through the outlet duct 74 through the motor 70 and back into the heat drive system housing 64. The motor 70 comprises an electrical motor outside of the heat drive system to prevent overheating. The motor 70 comprises a pulley with a timing belt that moves the bladed blower 68. Preferably, the system is computer controlled allowing continuous air circulation at a desired temperature. More preferably, the process allows for the temperature to change at any time according to the needs of the process.

For example, the computer senses a temperature below the required temperature and activates the heating element or disactivate the heater when the temperature is too high. The blower blows air across the heating element downstream. The system forces the air to travel in a closed loop circle continuously circulating through the oven keeping the temperature constant.

Figure 10:
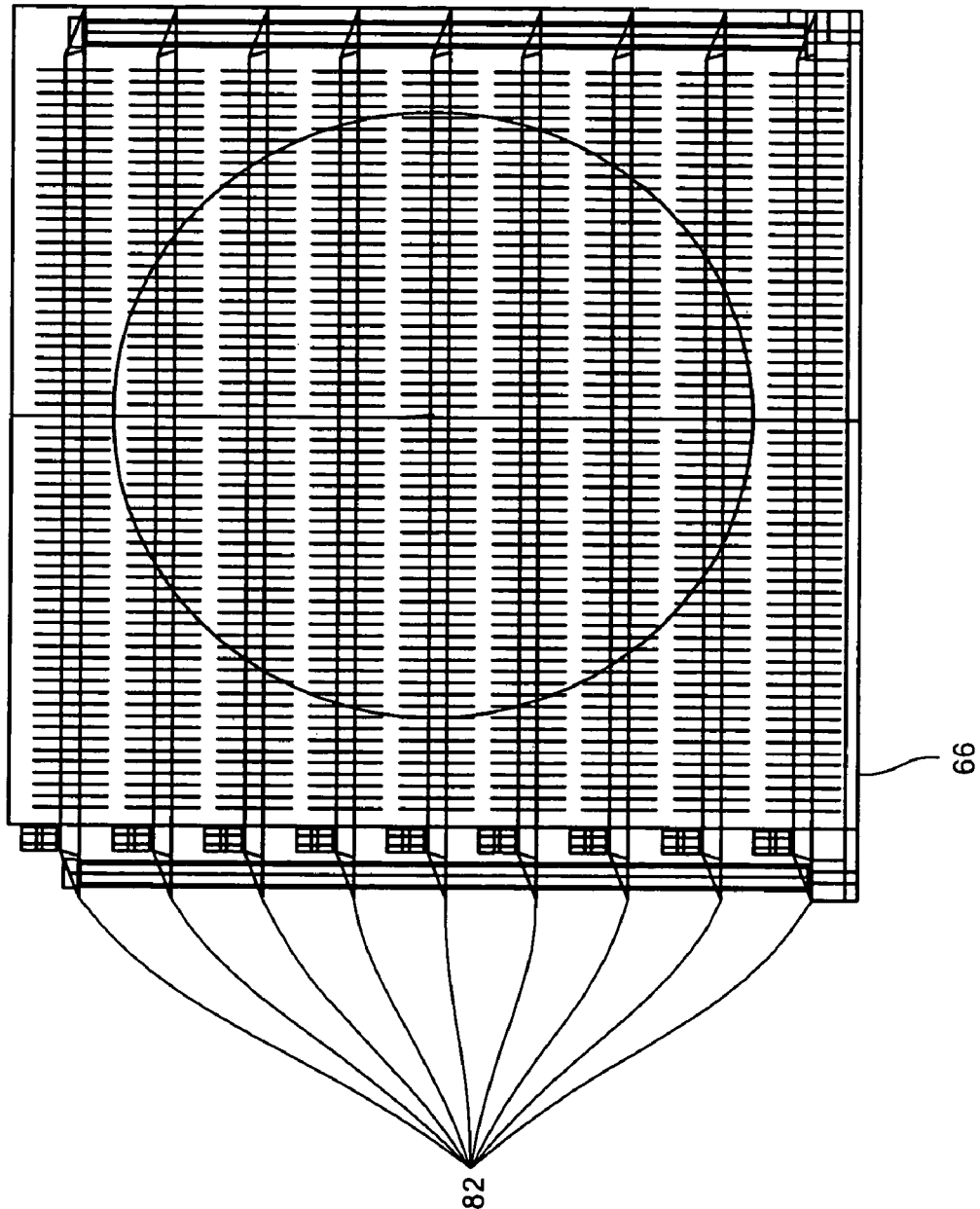
FIG. 10 is a cross-sectional view of the heating element in the oven represented in FIG. 9 showing each heater in the heating element in accordance with the invention.

FIG. 10 is a more detailed view of a preferred embodiment of the heating element 66. In one embodiment, the heater assembly comprises nine horizontal steel electrical heaters 82. Each heater unit is separate and distinct from the other heater.

Each heater unit is separated by a gap. Preferably, after sensing a temperature differential, the computer activates the number of heaters to provide sufficient heat. If the system requires the computer activates one of nine heaters. Alternatively, depending on the needs of the process, the computer activates every other heater in the heater assembly. In another embodiment the computer activates all heaters in the heater assembly. In a further alternative, the computer activates a portion of the heaters in the heater assembly or turns all the heaters off.

In an alternate embodiment, electromagnetic fields penetrate through the process material to heat the fibers and drive off any moisture. In another embodiment pulsed microwaves heat the fibers and drive off any moisture. In another embodiment, electron beam processing uses electrons as ionizing radiation to drive off any excess moisture.

In another embodiment, the puller pulls the fibers from zone 2 to zone 3, the fiber impregnation system. Zone 3 comprises a wet out tank 22. In a preferred embodiment, the wet out tank 22 contains a device that allows the redirection of fibers during wet out. Preferably, the device is located in the center of the tank and moves the fibers vertically up and down perpendicular to the direction of the pull whereby the deflection causes the fibers to reconfigure from a round configuration to a flat configuration. The flat configuration allows the fibers to lay side by side and allows for the fibers to be more thoroughly wetted by the resin.

Various alternative techniques well known in the art can be employed to apply or impregnate the fibers with resin. Such techniques include for example, spraying, dipping, reverse coating, brushing and resin injection. In an alternate embodiment, ultrasonic activation uses vibrations to improve the wetting ability of the fibers.

Generally, any of the various known heat curable thermosetting polymeric resin compositions can be used with the invention. The resin may be for example, PEAR (Poly-Ether Amide Resin), Bismaleimide, Polyimide, liquid-crystal polymer (LCP), and high temperature epoxy based on liquid crystal technology or similar resin materials. Resins are selected based on the process and the physical characteristics desired in the composite core.

Further, the viscosity of the resin affects the rate of formation. To achieve the desired proportion of fiber/resin for formation of the composite core member, preferably the viscosity ranges within the range of about 200 to about 1500 Centipoise at 20° C. More preferably, the viscosity falls in the range of about 200 to about 600 Centipoise 20° C. The resin is selected to have good mechanical properties and excellent chemical resistance to prolonged exposure of at least 60 years and more preferably, at least 70 years of operation up to about 230° C. A particular advantage of the present invention is the ability for the process to accommodate use of low viscosity resins. In accordance with the present invention, it is preferable to achieve a fiber/resin ratio within the range of 62-75% by weight. More preferable is a fiber/resin ratio within the range of 72-75% by weight. Low viscosity resins will sufficiently wet the fibers for the composite core member. A preferred polymer provides resistance to a broad spectrum of aggressive chemicals and has very stable dielectric and insulating properties. It is further preferable that the polymer meets ASTME595 outgassing requirements and UL94 flammability tests and is capable of operating intermittently at temperatures ranging between 220 and 280° C. without thermally or mechanically damaging the strength member.

To achieve the desired fiber to resin ratio, the upstream side of the wet out tank comprises a number of redirectional wiping bars. As the fibers are pulled through the wet out tank the fibers are adjusted up and down against a series of wiping bars removing excess resin. Alternatively, the redirection system comprises a wiper system to wipe excess resin carried out of the tank by the fibers. Preferably, the excess resin is collected and recycled into the wet out tank 22.

Alternatively, the wet out tank uses a series of squeeze out bushings to remove excess resin. During the wet out process each bundle of fiber contains as much as three times the desired resin for the final product. To achieve the right proportion of fiber and resin in the cross section of the composite core members, the amount of pure fiber is calculated. The squeeze out bushing in designed to remove a predetermined percentage of resin. For example, where the bushing passageway is twice as big as the area of the cross section of the fiber, a resin concentration greater than 50% by value won't be pulled through the bushing, the excess resin will be removed. Alternatively, the bushing can be designed to allow passage of 100% fiber and 20% resin.

Preferably, a recycle tray extends lengthwise under the wet out tank 22 to catch overflow resin. More preferably, the wet out tank has an auxiliary tank with overflow capability. Overflow resin is returned to the auxiliary tank by gravity through the piping. Alternatively, tank overflow is captured by an overflow channel and returned to the tank by gravity. In a further alternate, the process uses a drain pump system to recycle the resin back through the auxiliary tank and into the wet out tank. Preferably, a computer system controls the level of resin within the tank. Sensors detect low resin levels and activate a pump to pump resin into the tank from the auxiliary mixing tank into the processing tank. More preferably, there is a mixing tank located within the area of the wet out tank. The resin is mixed in the mixing tank and pumped into the resin wet out tank.

The pullers pull the fibers from zone 3 to zone 4, the B-stage zone. Zone 4 comprises an oven processing system 24. Preferably, the oven processing system is an oven with a computer system that controls the temperature of the air and keeps the air flow constant wherein the oven is the same as the oven in zone 2.

The pullers pull the fibers from zone 3 to zone 4. The oven circulates air in a circular direction downstream to upstream by a propeller heating system. The computer system controls the temperature at a temperature to heat the wet fiber to B-stage. Preferably, the process determines the temperature. B-stage temperature of the present invention ranges from within about 200 to 250° F. One advantage of the B-stage semi-cure process in the present invention is the ability to heat the resin to a semi-cure state in a short duration of time, approximately 1-1.5 minutes during the continuation of the process. The advantage is that the heating step does not affect the processing speed of the system. The B-stage process allows for the further tuning of the fiber/resin ratio by removing excess resin from the wet-out stage. Further, B-stage allows the fiber/resin matrix to be further compacted and configured during the process. Accordingly, the process differs from previous processes that use pre-preg semi-cure. Heating semi-cures the fibers to a tacky stage.

More specifically, in traditional composite processing applications, the wetted fibers are heated gradually to a semi-cure stage. However, the heating process generally takes periods of one hour or longer to reach the semi-cure stage. Moreover, the composite must be immediately wrapped and frozen to keep the composite at the semi-cure stage and prevent curing to a final stage. Accordingly, the processing is fragmented because it is necessary to remove the product from the line to configure the product.

In accordance with the present invention, the B-stage heating is dedicated to a high efficiency commercial application wherein semi-cure is rapid, preferably 1-1.5 minutes during a continuous process in line within the process.

Preferably, the resins are designed to allow rapid B-stage semi-curing that is held constant through the process allowing for shaping and configuring and further compaction of the product.

The pullers pull the fibers from B-stage zone 4 to zone 5 for the formation of the composite core member. Zone 5 comprises a next oven processing system 26 having a plurality of bushings. The bushings function to shape the cross section of the fiber tows 12. Preferably, the bushings are configured in a series comprising a parallel configuration with each other. In this embodiment, there is a set of seven bushings spaced laterally within the oven processing system 26. Preferably, the spacing of the bushings are adjusted according to the process. The bushings can be spaced equi-distance or variable distance from each other.

The series of bushings in zone 5 minimize friction due to the relatively thin bushing ranging within about ½ to ⅜ inch thick. Minimizing friction aids in maximizing the process speed.

Zones 4, 5 and 6 of the present invention extends within the range of about 30-45 feet. Most preferably, the zones 4, 5 and 6 extend at least 30 feet. This pulling distance and the decreased friction due to thin bushing plates aids in achieving a desired pull speed in the range of about 9 ft/min to about 50 ft/min. Most preferably about 20 ft/min. Processing speed is further increased due to the high fiber/resin ratio.

Figure 3:
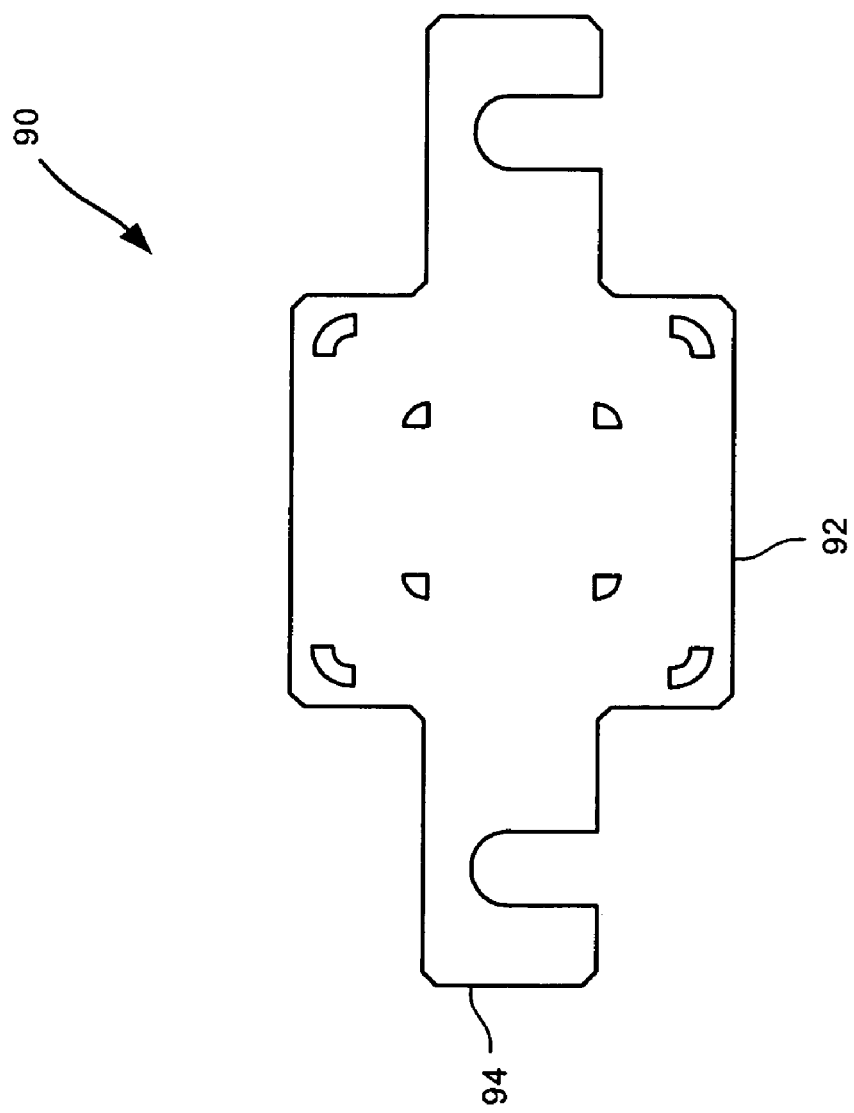
FIG. 3 is a schematic view of the structure of a bushing, said view showing the passageways used to shape and compress the bundles of reinforced fibers in accordance with the present invention.

Referring to FIG. 3, for example, the bushings 90 comprise a flat steel plate with a plurality of passageways through which the fiber tows 12 are pulled. The flat plate steel bushing 90 preferably ranges from ⅜ inch to ½ inch thick determined by the process. The bushings 90 have relatively thin walls to reduce friction and the amount of heat which must be added or removed by the heating and cooling process in order to achieve the temperature changes required to effect curing of the fiber resin matrix. The thickness of the bushing 90 is preferably the minimum thickness required to provide the structural strength necessary to constrain forces imposed upon the bushing 90 by the material passing therethrough. In particular, the thickness of the bushing 90 is preferably the minimum needed to limit deformation of the bushing wall to a tolerable level which will not interfere with the pulling of the material through the system.

Preferably, the design and size of the bushings 90 are the same. More preferably, the passageways within each bushing 90 diminish in size and vary in location within each successive bushing 90 in the upstream direction. FIG. 3 illustrates a preferred embodiment of a bushing 90. The bushing 90 comprises two hooked portions 94 and an inner preferably square portion 92. The inner square portion 92 houses the passageways through which the pulling mechanism pulls the fibers. The outer hooked portions 94 form a support system whereby the bushing 90 is placed within the oven in zone 5. The outer hooked portion 94 connects with interlocking long steel beams within the oven that function to support the bushings 90.

Zone 5 comprises a series of eight consecutive bushings. The bushings have two functions: (1) guide the fiber in the configuration for the final product; and (2) shape and compress the fibers. In one embodiment, the bushings 90 are placed apart within the oven supported on the hooked structures. The bushings 90 function to continually compress the fibers and form a composite core comprising, in this embodiment, carbon and glass while the process is under appropriate tension to achieve concentricity and uniform distribution of fiber without commingling of fibers.

Figure 5:
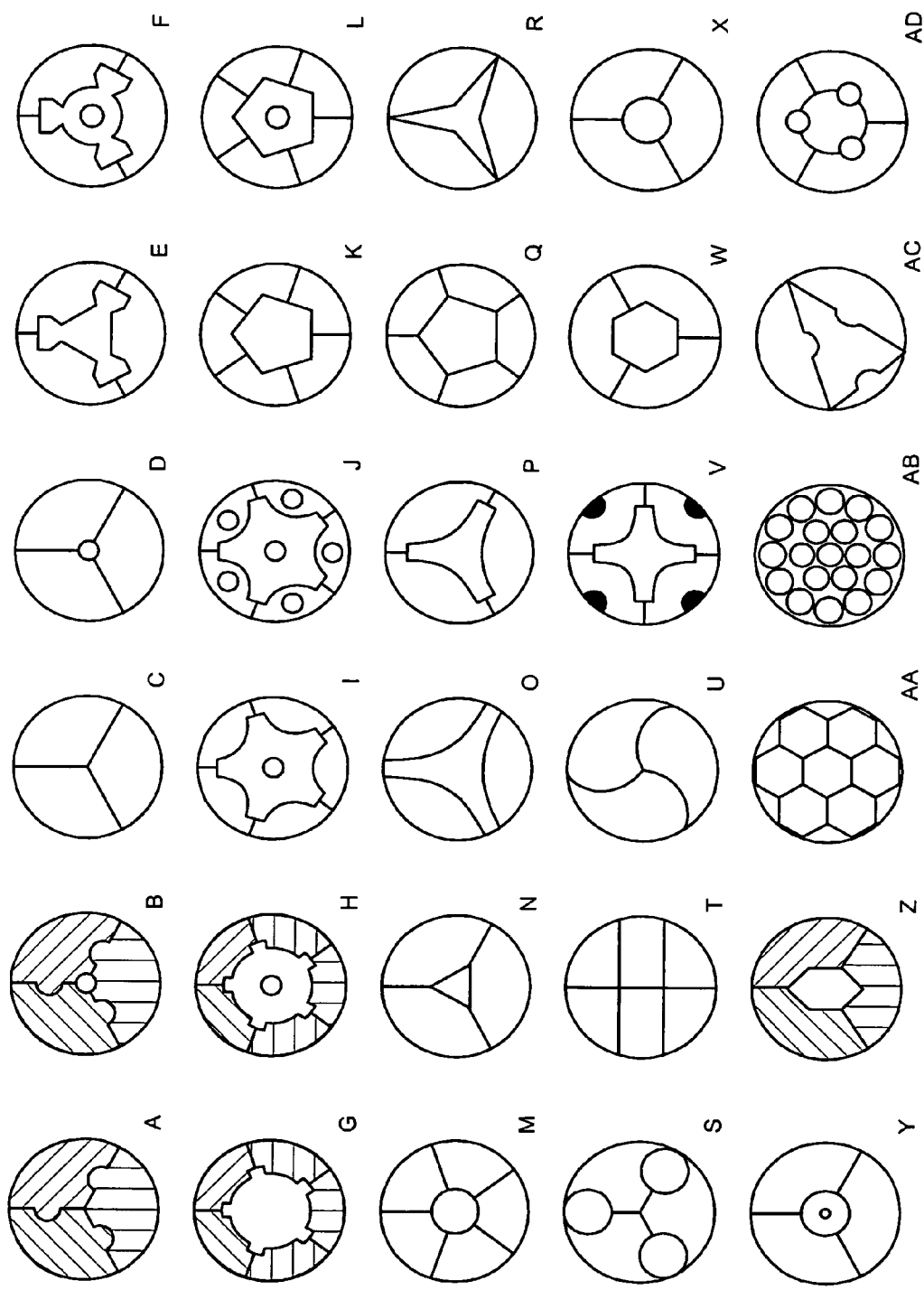
FIG. 5 shows a cross-sectional view of thirty possible composite core cross-section geometries according to the invention.

The bushings 90 may be designed to form bundles of a plurality of geometries. For example, FIG. 5 illustrates the variations in cross sections in composite member. Each cross section results from different bushing 90 design.

Figure 6:
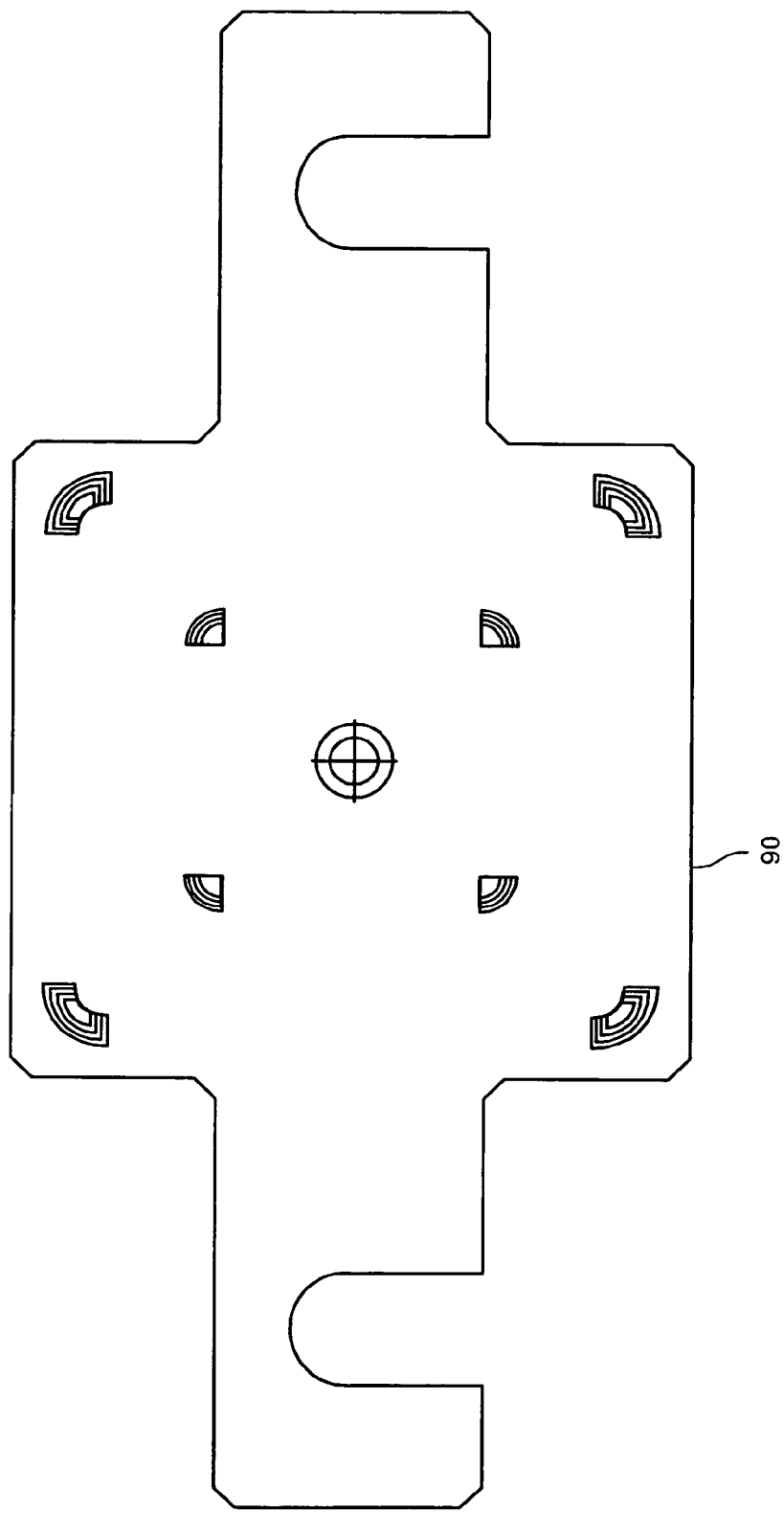
FIG. 6 is a multi-dimensional cross-sectional view of a plurality of bushings overlaid on top of one another showing the decreasing passageway size with respective bushings.

The passageways in each successive bushing 90 diminish in size further compacting the fiber bundles. For example, FIG. 6 shows each bushing 90 superimposed on top of one another. Several changes are apparent with each consecutive bushing 90. First, each overlayed bushing 90 shows that the size of each passageway decreases. Second, the superimposed figure shows the appearance of the center hole for compaction of the core element. Third, the figure shows the movement of the outer corner passageways towards the center position.

Figure 4:
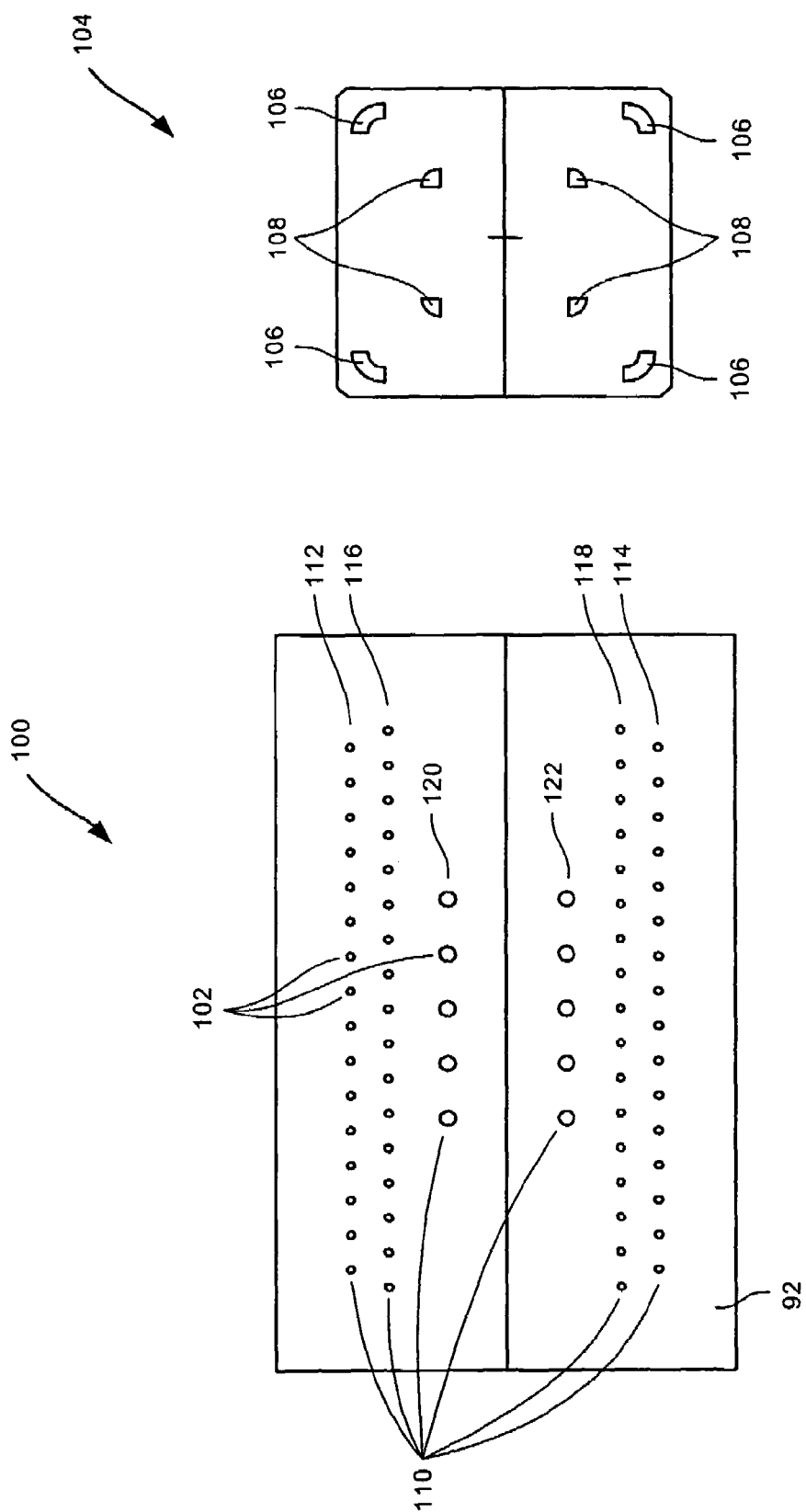
FIG. 4 is schematic comparison of two different bushings showing a reduction in the passageways from one bushing to the next to shape and compact the fibers into bundles in forming the composite core in accordance with the present invention.

Referring to FIG. 4, there are two bushings illustrated. The first bushing 100 illustrated, is in a similar configuration as the guide bushing 18. The second bushing 104 is the first in the series of bushings that function to compress and configure the composite core. The first bushing 100 comprises an inner square portion 92 with a plurality of passageways 102 prearranged through which the fibers are pulled. The passageways 102 are designed to align the fibers into groups in bushing two 104 having four outer groups 106 of fibers and four inner groups 108 of fibers. The inner square portion of the bushing 100 comprises six rows of passageways 110. The arrangement of the passageways 110 may be configured into any plurality of configurations depending on the desired cross section geometry of the composite core member. The top and bottom row, 112 and 114 respectively, contain the same number of passageways. The next to top and next to bottom rows, 116 and 118 respectively, contain the same number of passageways and the two inner rows 120 and 122 contain the same number of passageways.

In a preferred embodiment, the top and bottom rows contain 32 passageways each. The next level of rows contain 31 passageways each. The middle rows contain 4 passageways each. The pulling mechanism pulls two fibers through each passageway. Referring to FIG. 4 for example, the pulling mechanism pulls 126 glass fibers through rows 112, 114, 116 and 118. Further, the pulling mechanism pulls 16 carbon fibers through rows 120 and 122.

Figure 7:
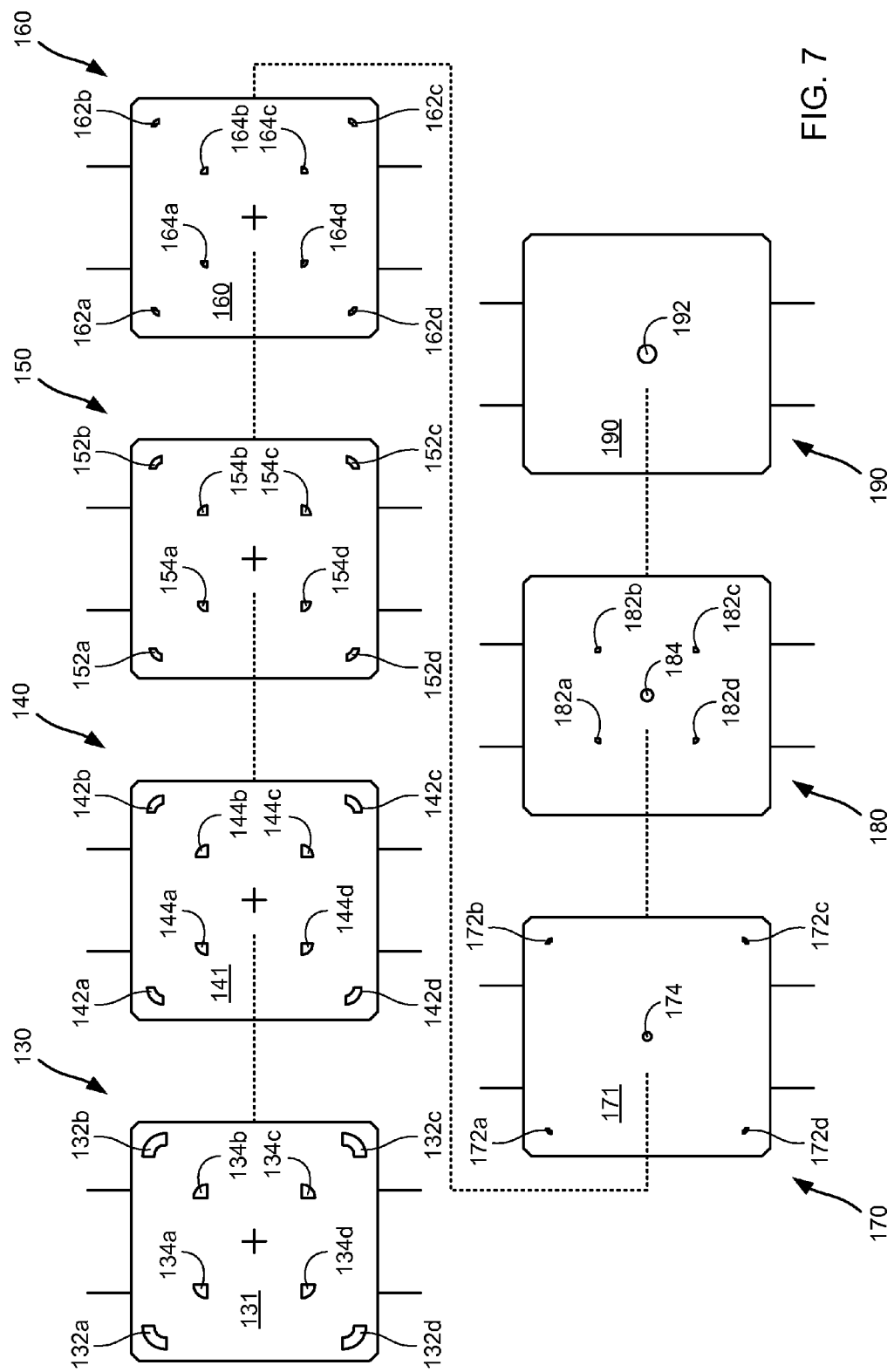
FIG. 7 is a multi-phase schematic view of a plurality of bushings showing migration of the passageways and diminishing size of the passageways with each successive bushing in accordance with the invention.

Referring to FIG. 7, the next bushing 130, bushing three in the series comprises an inner square portion 131 having four outer corner passageways 132a, 132b, 132c and 132d and four inner passageways 134a, 134b, 134c and 134d. The fibers exit bushing two and are divided into equal parts and pulled through bushing three. Each passageway in bushing three comprises one quarter of the particular type of fiber pulled through bushing two. More specifically, the top two rows of the top and the bottom of bushing two are divided in half whereby the right half of the top two rows of fibers are pulled through the right outer corner of bushing three. The left half of the top two rows of fibers are pulled through the upper left corner 132a of bushing three 130. The right half of the top two rows of fibers are pulled through the upper right corner 132b of bushing three 130. The right half of the bottom two rows of fibers are pulled through the lower right corner 132c of bushing three. The left half of the bottom two rows of fibers are pulled through the lower left corner 132d of bushing three 130. The inner two rows of bushing one are divided in half whereby the top right half of the top middle row of fibers is pulled through the inner upper right corner 134b of bushing three 130. The left half of the top middle row of fibers is pulled through the inner upper left corner 134a of bushing three 130. The right half of the lower middle row of fibers is pulled through the inner lower right corner 134*c* of bushing three 130. The left half of the lower middle row of fibers is pulled through the inner lower left corner 134*d* of bushing three 130. Accordingly, bushing three 130 creates eight bundles of impregnated fibers that will be continually compressed through the series of next bushings.

The puller pulls the fibers through bushing three 130 to bushing four 140. Bushing four 140 comprises the same configuration as bushing three 130. Bushing four 140 comprises a square inner portion 141 having four outer corner passageways 142*a*, 142*b*, 142*c* and 142*d* and four inner passageways 144*a*, 144*b*, 144*c* and 144*d*. Preferably, the four outer corner passageways 142*a-d* and the four inner passageways 144*a-d* are slightly smaller in size than the similarly configured passageways in bushing three 130. Bushing four 140 compresses the fibers pulled through bushing three.

The puller pulls the fibers from bushing four 140 to bushing five 150. Preferably, the four outer corner passageways 152*a*, 152*b*, 152*c* and 152*d* and the four inner passageways 154*a*, 154*b*, 154*c* and 154*d* are slightly smaller in size than the similarly configured passageways in bushing four 140. Bushing five 150 compresses the fibers pulled through bushing four 140.

For each of the successive bushings, each bushing creates a bundle of fibers with an increasingly smaller diameter. Preferably, each smaller bushing wipes off excess resin to approach the optimal and desired proportion of resin to fiber composition.

The puller pulls the fibers from bushing five 150 to bushing six 160. Preferably, the four outer corner passageways 162*a*, 162*b*, 162*c* and 162*d* and the four inner passageways 164*a*, 164*b*, 164*c* and 164*d* are slightly smaller in size than the similarly configured passageways in bushing five 150. Bushing six 160 compresses the fibers pulled through bushing five 150.

Bushing seven 170 comprises an inner square 171 having four outer corner passageways 172*a*, 172*b*, 172*c* and 172*d* and one inner passageway 174. The puller pulls the fibers from the four inner passageways 164 of bushing six 160 through the single inner passageway 174 in bushing seven 170. The process compacts the product to a final uniform concentric core. Preferably, fibers are pulled through the outer four corners 172*a*, 172*b*, 172*c*, 172*d* of bushing seven 170 simultaneous with compacting of the inner four passageways 164 from bushing six 160.

The puller pulls the fibers through bushing seven 170 to bushing eight 180. The puller pulls the inner compacted core 184 and the outer four corners 182*a*, 182*b*, 182*c*, 182*d* migrate inwardly closer to the core 184. Preferably, the outer fibers diminish the distance between the inner core and the outer corners by half the distance.

The puller pulls the fibers through bushing eight 180 to bushing nine 190. Bushing nine 190 is the final bushing for the formation of the composite core. The puller pulls the four outer fiber bundles and the compacted core through a passageway 192 in the center of bushing nine 190.

Figure 8:
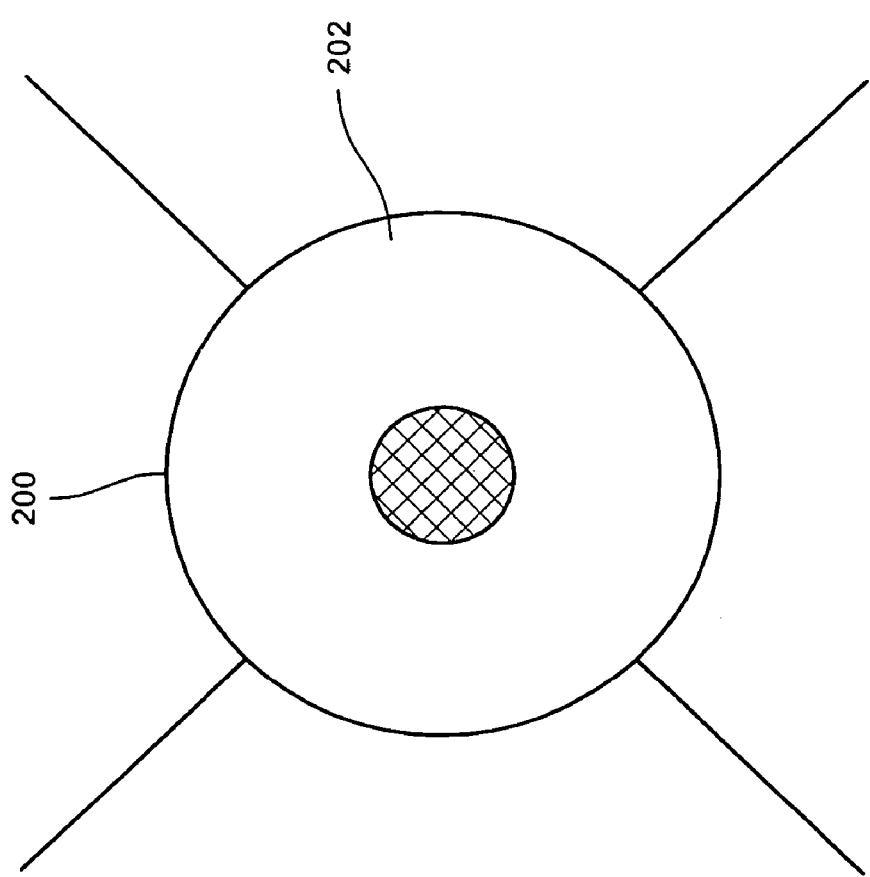
FIG. 8 is a cross sectional view of one embodiment of a composite core according to the invention.

Preferably, bushing nine 190 compacts the outer portion and the inner portion creating an inner portion of carbon and an outer portion of glass fiber. FIG. 8 for example, illustrates a cross-section of a composite cable. The example illustrates a composite core member 200 having an inner reinforced carbon fiber composite portion 202 surrounded by an outer reinforced glass fiber composite portion 204.

Temperature is kept constant throughout zone 5. The temperature is determined by the process and is high enough to keep the resin in a semi-cured state. At the end of zone 5, the product comprises the final level of compaction and the final diameter.

The puller pulls the fibers from zone 5 to zone 6 a curing stage preferably comprising an oven with constant heat and airflow as in zone 5, 4 and 2. The oven uses the same constant heating and cross circular air flow as in zone 5, zone 4 and zone 2. The process determines the curing heat. The curing heat remains constant throughout the curing process. In the present invention, the preferred temperature for curing ranges from about 350° F. to about 400° F. The curing process preferably spans within the range of about 8 to about 15 feet. More preferably, the curing process spans about 10 feet in length. The high temperature of zone 6 results in a final cure forming a hard resin.

Zone 6 may incorporate a bushing ten to assure that the final fiber composite cor member holds its shape. In addition, another bushing prevents bluming of the core during curing.

During the next stages the composite core member product is pulled through a series of heating and cooling phases. The post cure heating improves cross linking within the resin matrix improving the physical characteristics of the product. The pullers pull the fibers to zone 7, a cooling device. Preferably, the mechanical configuration of the oven is the same as in zones 2, 4, 5 and 6. More specifically, the device comprises a closed circular air system using a cooling device and a blower. Preferably, the cooling device comprises a plurality of coils. Alternatively, the coils may be horizontally structured consecutive cooling elements. In a further alternative, the cooling device comprises cooling spirals. The blower is placed upstream from the cooling device and continuously blows air in the cooling chamber in an upstream direction. The air circulates through the device in a closed circular direction keeping the air throughout at a constant temperature. Preferably, the cooling temperature ranges from within about 40 to about 180° F.

The pullers pull the composite member through zone 7 to zone 8, the post-curing phase. The composite core member is heated to post-curing temperature to improve the mechanical properties of the composite core member product.

The pullers pull the composite core member through zone 8 to zone 9, the post curing cooling phase. Once the composite core has been reheated, the composite core is cooled before the puller grabs the compacted composite core. Preferably, the composite core member cools for a distance ranging about 8 to about 15 feet by air convection before reaching the puller. Most preferably, the cooling distance is about 10 feet.

The pullers pull the composite core member through the zone 9 cooling phase into zone 10, a winding system whereby the fiber core is wrapped around a wheel for storage. It is critical to the strength of the core member that the winding does not over stress the core by bending. In one embodiment, the core does not have any twist and can only bend a certain degree. In another embodiment, the wheel has a diameter of seven feet and handles up to 6800 feet of B-stage formed composite core member. The wheel is designed to accommodate the stiffness of the B-stage formed composite core member without forcing the core member into a configuration that is too tight. In a further embodiment, the winding system comprises a means for preventing the wheel from reversing flow from winding to unwinding. The means can be any device that prevents the wheel direction from reversing for example, a brake system.

In a further embodiment, the process includes a quality control system comprising a line inspection system. The quality control process assures consistent product. The quality control system may include ultrasonic inspection of composite core members; record the number of tows in the end product; monitor the quality of the resin; monitor the temperature of the ovens and of the product during various phases; measure formation; measure speed of the pulling process. For example, each batch of composite core member has supporting data to keep the process performing optimally. Alternatively, the quality control system comprises a marking system. The marking system wherein the marking system marks the composite core members with the product information of the particular lot. Further, the composite core members may be placed in different classes in accordance with specific qualities, for example, Class A is high grade, Class B and Class C.

The fibers used to process the composite core members can be interchanged to meet specifications required by the final composite core member product. For example, the process allows replacement of fibers in a composite core member having a carbon core and a glass fiber outer core with high grade carbon and E-glass. The process allows the use of more expensive better performing fibers in place of less expensive fibers due to the combination of fibers and the small core size required. In one embodiment, the combination of fibers creates a high strength inner core with minimal conductivity surrounded by a low modulus nonconductive outer insulating layer. In another embodiment, the outer insulating layer contributes to the flexibility of the composite core member and enables the core member to be wound, stored and transported.

Another embodiment of the invention, allows for redesign of the composite core cross section to accommodate varying physical properties and increase the flexibility of the composite core member. Referring again to FIG. 5, the different composite shapes change the flexibility of the composite core member. Changing the core design may enable winding of the core on a smaller diameter wheel. Further, changing the composite core design may affect the stiffness and strength of the inner core. As an advantage, the core geometry may be designed to achieve optimal physical characteristics desired in a final ACCC cable.

In another embodiment of the invention, the core diameter is greater than 0.375 inches. A core greater than 0.375 inches cannot bend to achieve a 7-foot wrapping diameter. The potential strength on the outside bend shape exceeds the strength of the material and the material will crack. A core diameter of ½ to ⅝ inch may require a wheel diameter of 15 feet and this is not commercially viable. To increase the flexibility of the composite core, the core may be twisted or segmented to achieve a wrapping diameter that is acceptable. One 360 degree twist of fiber orientation in the core for one revolution of core. Alternatively, the core can be a combination of twisted and straight fiber. The twist may be determined by the wheel diameter limit. If the limit is prohibited then twist by one revolution of diameter of the wheel. The tension and compression stresses in the core are balanced by one revolution.

Winding stress is reduced by producing a segmented core. FIG. 5 illustrates some examples of possible cross section configurations of segmented cores. The segmented core under the process is formed by curing the section as separate pieces wherein the separate pieces are then grouped together. Segmenting the core enables a composite member product having a core greater than 0.375 inches to achieve a desirable winding diameter without additional stress on the member product.

Variable geometry of the cross sections in the composite core members are preferably processed as a multiple stream. The processing system is designed to accommodate formation of each segment in parallel. Preferably, each segment is formed by exchanging the series of consecutive bushings for bushings having predetermined configurations for each of the passageways. In particular, the size of the passageways may be varied to accommodate more or less fiber, the arrangement of passageways may be varied in order to allow combining of the fibers in a different configuration in the end product and further bushings may be added within the plurality of consecutive bushings to facilitate formation of the varied geometric cross sections in the composite core member. At the end of the processing system the five sections in five streams of processing are combined at the end of the process to form the composite cable core. Alternatively, the segments may be twisted to increase flexibility and facilitate winding The final composite core is wrapped in lightweight high conductivity aluminum forming a composite cable. Preferably, the composite core cable comprises an inner carbon core having an outer insulating glass fiber composite layer and two layers of trapezoidal formed strands of aluminum.

In one embodiment, the inner layer of aluminum comprises a plurality of trapezoidal shaped aluminum segments wrapped in a counter-clockwise direction around the composite core member. Each trapezoidal section is designed to optimize the amount of aluminum and increase conductivity. The geometry of the trapezoidal segments allows for each segment to fit tightly together and around the composite core member.

In a further embodiment, the outer layer of aluminum comprises a plurality of trapezoidal shaped aluminum segments wrapped in a clockwise direction around the composite core member. The opposite direction of wrapping prevents twisting of the final cable. Each trapezoidal aluminum element fits tightly with the trapezoidal aluminum elements wrapped around the inner aluminum layer. The tight fit optimizes the amount of aluminum and decreases the aluminum required for high conductivity.

EXAMPLE

A particular embodiment of the invention is now described wherein the composite strength member comprises E-glass and carbon type 13 sizing. E-glass combines the desirable properties of good chemical and heat stability, and good electrical resistance with high strength. The cross-sectional shape or profile is illustrated in FIG. 8 wherein the composite strength member comprises a concentric carbon core encapsulated by a uniform layer of glass fiber composite. In a preferred embodiment the process produces a hybridized core member comprising two different materials.

The fiber structures in this particular embodiment are 126 ends of E-glass product, yield 900, Veterotex Amer and 16 ends of carbon Torayca T7DOS yield 24K. The resin used is an epoxy resin called ARALDITE MY 721 from Vantico.

In operation, the ends of 126 fiber tows of E-glass and 16 fiber tows of carbon are threaded through a fiber tow guide comprising two rows of 32 passageways, two rows inner of 31 passageways and two innermost rows of 4 passageways and into a preheating stage at 150° F. to evacuate any moisture. After passing through the preheating oven, the fiber tows are pulled through a wet out tank. In the wet out tank a device effectually moves the fibers up and down in a vertical direction enabling thorough wetting of the fiber tows. On the upstream side of the wet out tank is located a wiper system that removes excess resin as the fiber tows are pulled from the tank. The excess resin is collected by a resin overflow tray and added back to the resin wet out tank.

The fiber tows are pulled from the wet out tank to a B-state oven that semi-cures the resin impregnated fiber tows to a tack stage. At this stage the fiber tows can be further compacted and configured to their final form in the next phase. The fiber tows are pulled to a next oven at B-stage oven temperature to maintain the tack stage. Within the oven are eight consecutive bushings that function to compact and configure the fiber tows to the final composite core member form. Two fiber tow ends are threaded through each of the 134 passageways in the first bushing which are machined to pre-calculated dimensions to achieve a fiber volume of 72 percent and a resin volume of 28 percent in the final composite core member. The ends of the fiber tows exiting from passageways in the top right quarter comprising half of the two top rows are threaded through passageways 132 of the next bushing; the ends of the fiber tows exiting from passageways in the top left quarter comprising half of the top two rows are threaded through passageway 136 of the next bushing; the ends of the fiber tows exiting from passageways in the lower right quarter comprising half of the bottom two rows are threaded through passageway 140 of the next bushing; the ends of the fiber tows exiting from passageways in the lower left quarter comprising half of the bottom two rows are threaded through passageway 138 of the next bushing; the right and left quarters of passageways in the middle upper row are threaded through passageways 142 and 144 of the next bushing and the right and left quarters of passageways in the middle bottom row are threaded through passageways 134 and 146 respectively.

The fiber tows are pulled consecutively through the outer and inner passageways of each successive bushing further compacting and configuring the fiber bundles. At bushing seven, the fiber bundles pulled through the inner four passageways of bushing six are combined to form a composite core whereas the remaining outer passageways continue to keep the four bundles glass fibers separate. The four outer passageways of bushing seven are moved closer inward in bushing eight, closer to the inner carbon core. The fiber tows are combined with the inner carbon core in bushing nine forming a hybridized composite core member comprising an inner carbon core having an outer glass layer.

The composite core member is pulled from the bushing nine to a final curing oven at an elevated temperature of 380° F. as required by the specific resin. From the curing oven the composite core member is pulled through a cooling oven to be cooled to 150 to 180° F. After cooling the composite core member is pulled through a post curing oven at elevated temperature, preferably to heat the member to at least B-stage temperature. After post-curing the member is cooled by air to approximately 180° F. The member is cooled prior to grabbing by the caterpillar puller to the core winding wheel having 6000 feet of storage.

EXAMPLE

An example of an ACCC reinforced cable in accordance with the present invention follows. An ACCC reinforced cable comprising four layers of components consisting of an inner carbon/epoxy layer, a next glassfiber/epoxy layer and two layers of tetrahedral shaped aluminum strands. The strength member consists of an advanced composite T700S carbon/epoxy having a diameter of about 0.2165 inches, surrounded by an outer layer of R099-688 glassfiber/epoxy having a layer diameter of about 0.375 inches. The glassfiber/epoxy layer is surrounded by an inner layer of nine trapezoidal shaped aluminum strands having a diameter of about 0.7415 inches and an outer layer of thirteen trapezoidal shaped aluminum strands having a diameter of about 1.1080 inches. The total area of carbon is about 0.037 in$^2$, of glass is about 0.074 in$^2$, of inner aluminum is about 0.315 in$^2$ and outer aluminum is about 0.5226 in$^2$. The fiber to resin ratio in the inner carbon strength member is 70/30 by weight and the outer glass layer fiber to resin ratio is 75/25 by weight.

The specific specifications are summarized in the following table:

| Glass Vetrotex roving R099-686 (900 Yield) | |
|---|---|
| Tensile Strength, psi | 298,103 |
| Elongation at Failure, % | 3.0 |
| Tensile Modulus, x 10$^6$ psi | 11.2 |
| Glass Content, % | 57.2 |
| Carbon (graphite) Carbon: Torayca T700S (Yield 24K) | |
| Tensile strength, Ksi | 711 |
| Tensile Modulus, Msi | 33.4 |
| Strain | 2.1% |
| Density lbs/ft$^3$ | 0.065 |
| Filament Diameter, in | 2.8E−04 |
| Epoxy Matrix System Araldite MY 721 | |
| Epoxy value, equ./kg | 8.6-9.1 |
| Epoxy Equivalent, g/equ. | 109- |
| Viscosity @ 50 C., cPs | 3000-6000 |
| Density @ 25 C. lb/gal. | 1.1501.18 |
| Hardener 99-023 | |
| Viscosity @ 25 C., cPs | 75-300 |
| Density @ 25 C., lb/gal | 1.19-1/22 |
| Accelerator DY 070 | |
| Viscosity @ 25 C., cPs | <50 |
| Density @ 25 C., lb/gal | 0.95-1.05 |

An ACCC reinforced cable having the above specifications is manufactured according to the following. The process used to form the composite cable in the present example is illustrated in FIG. 1. First, 126 spools of glass fiber tows 12 and 8 spools of carbon are set up in the rack system 14 and the ends of the individual fiber tows 12, leading from spools 11, are threaded through a fiber tow guide 18. The fibers undergo tangential pulling to prevent twisted fibers. A puller 16 at the end of the apparatus pulls the fibers through the apparatus. Each dispensing rack 14 has a small brake to individually adjust the tension for each spool. The tows 12 are pulled through the guide 18 and into a preheating oven 20 at 150° F. to evacuate moisture.

The tows 12 are pulled into wet out tank 22. Wet out tank 22 is filled with an epoxy resin called ARALDITE MY 721 MY 721/Hardener 99-023/Accelerator DY070 to impregnate the fiber tows 12. Excess resin is removed from the fiber tows 12 during wet out tank 22 exit. The fiber tows 12 are pulled from the wet out tank 22 to a B-stage oven 24 and are heated to 200° F. Fiber tows 12 maintained separated by the guide 18, are pulled into a second B-stage oven 26 also at 200° F. comprising a plurality of consecutive bushings to compress and configure the tows 12. In the second B-stage oven 26, the fiber tows 12 are directed through a plurality of passageways provided by the bushings. The consecutive passageways continually compress and configure the fiber tows 12 into the final uniform composite core member.

The first bushing has two rows of 32 passageways, two inner rows of 31 passageways each and two inner most rows of 4 passageways each. The 126 glass fiber tows are pulled through the outer two rows of 32 and 31 passageways, respectively. The carbon fiber tows are pulled through the inner two rows of 4 passageways eaten. The next bushing splits the top two rows in half and the left portion is pulled through the left upper and outer corner passageway in the second bushing. The right portion is pulled through the right upper and outer corner passageway in the second bushing. The bottom two rows are split in half and the right portion is pulled through the lower right outer corner of the second bushing and the left portion is pulled through the lower left outer corner of the second bushing. Similarly, the two inner rows of carbon are split in half and the fibers of the two right upper passageways are pulled through the inner upper right corner of the second bushing. The fibers of the left upper passageways are pulled through the inner upper left corner of the second bushing. The fibers of the right lower passageways are pulled through the inner lower right corner of the second bushing and the fibers of the left lower passageways are pulled through the inner lower left corner of the second bushing.

The fiber bundles are pulled through a series of seven bushings continually compressing and configuring the bundles into one hybridized uniform concentric core member.

The composite core member is pulled from the second B-stage oven 26 to a next oven processing system 28 at 330 to 370° F. wherein the composite core member is cured and pulled to a next cooling system 30 at 30 to 100° F. for cooling. After cooling, the composite core is pulled to a next oven processing system 32 at 330 to 370° F. for post curing. The pulling mechanism pulls the product through a 10 foot air cooling area at about 180° F.

Nine trapezoidal shaped aluminum strands each having an area of about 0.0350 or about 0.315 sq. in. total area on the core are wrapped around the composite core after cooling. Next, thirteen trapezoidal shaped aluminum strands each strand having an area of about 0.0402 or about 0.5226 sq. in. total area on the core are wrapped around the inner aluminum layer.

It is to be understood that the invention is not limited to the exact details of the construction, operation, exact materials, or embodiments shown and described, as modifications and equivalents will be apparent to one skilled in the art without departing from the scope of the invention.

We claim:

1. A composite core for an electrical cable comprising:
    an inner core comprising a plurality of substantially continuous reinforcing fibers of at least a first type, the first fiber type having a tensile strength that exceeds the tensile strength of glass fibers;
    an outer core comprising a plurality of substantially continuous reinforcing fibers of at least a second type, the second fiber type having a tensile strength of or similar to glass fibers; and
    a resin matrix, wherein the fibers of the inner and the outer cores are embedded therein; wherein, the fibers of the inner core are different from the fibers of the outer core, and wherein the fibers of the inner and the outer cores are oriented substantially parallel to the longitudinal axis.

2. A composite core as claimed in claim 1 wherein, the first fiber type is carbon.

3. A composite core as claimed in claim 1, wherein the second fiber type is glass.

4. A composite core as claimed in claim 1 wherein, the first reinforcing fiber type in the inner core comprises a modulus of elasticity in the range of about 22 (151 GPa) to 37 Msi (255 GPa) coupled with a coefficient of thermal expansion in the range of about −0.7 to about 0 m/m/° C. and a tensile strength of at least about 350 Ksi (2413 MPa) and the second reinforcing fiber type in the outer core comprises a tensile strength in the range of at least about 180 Ksi (1241 MPa) coupled with a coefficient of thermal expansion in the range of about $5\times10^{-6}$ to about $10\times10^{-6}$ m/m/° C.

5. A composite core as claimed in claim 1 wherein, the composite material of the inner core and the outer core is selected to meet physical characteristics in the end composite core including a tensile strength of at least 160 Ksi (1103 MPa), a modulus of elasticity in the range of at least about 7 Msi (48 GPa) to about 30 Msi (206 GPa), an operating temperature in the range of about 90 to about 230° C. and a thermal expansion coefficient at least in the range of about 0 to about $6\times10^{-6}$ m/m/° C.

6. A composite core as claimed in claim 1 comprising a fiber/resin volume fraction in the range of at least about 50%.

7. A composite core as claimed in claim 1 comprising a fiber/resin ratio of at least about 62% by weight.

8. A composite core as claimed in claim 1 wherein, the inner core comprises carbon fibers and the outer core comprises glass fibers.

9. A composite core as set forth in claim 1 wherein, said outer core and said inner core form a segmented concentric core.

10. A composite core as claimed in claim 1 wherein, at least one layer of a plurality of aluminum segments is wrapped around the core.

11. A composite core for an electrical cable comprising:
    a plurality of reinforcing fibers in a thermosetting resin matrix to form the core, said core having at least 50% fiber volume fraction, the plurality of reinforcing fibers consisting of two or more different types of fibers, a first fiber type having a modulus of elasticity in the range of about 22 (151 GPa) to 37 Msi (255 GPa) and a tensile strength at least about 350 Ksi (2413 MPa) and a second fiber type having a modulus of elasticity in the range of about 6 Msi to about 11.2 Msi and a tensile strength of at least about 180 Ksi (1241 MPa); wherein, the fibers are arranged within the resin matrix having the higher tensile strength fibers in the center of the core.

12. A composite core as claimed in claim 11 wherein, the first reinforcing fiber type is carbon.

13. A composite core as claimed in claim 11 wherein, the second reinforcing fiber type is glass.

14. A composite core as claimed in claim 11 wherein, the proportion and type of fibers are selected to meet physical characteristics in the end composite core including a tensile strength in the range of at least 160 Ksi (1103 MPa), a modulus of elasticity in the range of at least about 7 (48 GPa) to about 30 Msi (206 GPa), an operating temperature in the range of about 90 to about 230° C. and a thermal expansion coefficient at least in the range of about 0 to about $6 \times 10^{-6}$ m/m/° C.

15. A composite core as claimed in claim 11 comprising a fiber resin ratio of at least about 62% by weight.

16. A composite core as claimed in claim 11 wherein the first fiber type forms an inner core and the second fiber type forms an outer core that surrounds the inner core.

17. A composite core as claimed in claim 16 wherein, the inner core comprises carbon fibers and the outer core comprises glass fibers.

18. A composite core as set forth in claim 11 wherein, the core is segmented.

19. A composite core as claimed in claim 11 wherein, at least one layer of a plurality of aluminum segments is wrapped around the core.

20. A composite core for an electrical cable comprising:
an inner core consisting of a plurality of substantially continuous reinforcing fibers, the fibers having a tensile strength that exceeds the tensile strength of glass fibers;
an outer core surrounding the inner core consisting at least in part of a plurality of substantially continuous reinforcing glass fibers; and
a cured resin matrix, wherein the fibers of the inner and the outer cores are embedded therein;
wherein, the fibers of the inner and the outer cores are oriented substantially parallel to the longitudinal axis.

21. A composite core as claimed in claim 20 wherein, the fibers of the inner core are carbon.

22. A composite core as claimed in claim 20 wherein, the inner core comprises carbon and basalt fibers.

23. A composite core as claimed in claim 20 wherein, the fibers of the inner core have a modulus of elasticity in the range of about 22 to about 37 Msi.

24. A composite core as claimed in claim 20 comprising a fiber/resin volume fraction in the range of at least about 50%.

25. A composite core as claimed in claim 20 comprising a fiber resin ratio of at least about 62% by weight.

26. A composite core as claimed in claim 20 wherein, at least one layer of a plurality of aluminum segments is wrapped around the core.

27. A composite core for an electrical cable comprising:
an inner core comprising a plurality of reinforcing carbon fibers and at least a portion of a plurality of reinforcing fibers having a tensile strength in excess of glass fibers;
an outer core surrounding the inner core comprising a plurality of glass fibers; and
a cured resin matrix, wherein the fibers of the inner and the outer cores are embedded therein;
wherein, the fibers of the inner and outer cores are oriented substantially parallel to the longitudinal axis.

28. The composite core as claimed in claim 27, wherein the fiber having a tensile strength in excess of glass fibers is basalt.

29. An electrical cable comprising:
a composite core further comprising:
an inner core comprising a plurality of substantially continuous reinforcing fibers of at least a first type, the first type having a tensile strength that exceeds the tensile strength of glass fibers, wherein the fibers are substantially parallel to the longitudinal axis;
an outer core comprising a plurality of substantially continuous reinforcing fibers of at least a second type, the second type having a tensile strength of or similar to glass fibers, wherein the fibers are substantially parallel to the longitudinal axis; and
a cured resin matrix, wherein the fibers of the inner and the outer cores are embedded therein; and
at least one layer of conductor surrounding said outer core.

30. An electrical cable as claimed in claim 29 wherein, the composite material of the inner core and the outer core is selected to meet physical characteristics in the end composite core including a tensile strength of at least 160 Ksi (1103 MPa), a modulus of elasticity in the range of at least about 7 Msi (48 GPa) to about 30 Msi (206 GPa), an operating temperature in the range of about 90 to about 230° C. and a thermal expansion coefficient at least in the range of about 0 to about $6 \times 10^{-6}$ m/m/° C.

31. An electrical cable as claimed in claim 29 wherein, the composite core comprises a fiber/resin volume fraction in the range of at least about 50%.

32. An electrical cable as claimed in claim 29 wherein, the composite core comprises a fiber/resin ratio of at least about 62% by weight.

33. An electrical cable as claimed in claim 29 wherein, the fibers of the inner core are carbon and the fibers of the outer core are glass.

34. An electrical cable as claimed in claim 29 wherein, the conductor surrounding the core comprises a plurality of aluminum segments.

35. An electrical cable as set forth in claim 29 wherein, the composite core is segmented.

36. A method of transmitting electrical power comprising:
using a cable comprising a composite core and at least one layer of aluminum conductor surrounding the composite core, the composite core further comprising:
an inner core comprising a plurality of substantially continuous reinforcing fibers of at least a first type, the first type having a tensile strength that exceeds the tensile strength of glass fibers, wherein the fibers are substantially parallel to the longitudinal axis;
an outer core comprising a plurality of substantially continuous reinforcing fibers of at least a second type, the second type having a tensile strength of or similar to glass fibers, wherein the fibers are substantially parallel to the longitudinal axis; and
a cured resin matrix, wherein the fibers of the inner and the outer cores are embedded therein; and
transmitting power across the composite cable.

* * * * *

UNITED STATES PATENT AND TRADEMARK OFFICE
CERTIFICATE OF CORRECTION

PATENT NO. : 7,368,162 C2
APPLICATION NO. : 90/011740
DATED : May 8, 2012
INVENTOR(S) : Clement Hiel and George Korzeniowski It is certified that error appears in the above-identified patent and that said Letters Patent is hereby corrected as shown below:

Title Page, Item (73) Assignee:, delete "Partners for Growth II, L.P., San Francisco, CA (US)" and insert therefor --CTC Cable Corporation, Irvine, CA (US)--.

Signed and Sealed this
Seventh Day of August, 2012

David J. Kappos
*Director of the United States Patent and Trademark Office*

(12) EX PARTE REEXAMINATION CERTIFICATE (7555th)
United States Patent
Hiel et al.

(10) Number: US 7,368,162 C1
(45) Certificate Issued: Jun. 8, 2010

(54) ALUMINUM CONDUCTOR COMPOSITE CORE REINFORCED CABLE AND METHOD OF MANUFACTURE

(75) Inventors: Clem Hiel, Rancho Palos Verdes, CA (US); George Korzlenowski, Woodland Hills, CA (US)

(73) Assignee: CTC Cable Corporation, Irvine, CA (US)

Reexamination Request:
No. 90/009,493, Jul. 18, 2009

Reexamination Certificate for:
Patent No.: 7,368,162
Issued: May 6, 2008
Appl. No.: 10/511,881
Filed: Oct. 19, 2004

(22) PCT Filed: Apr. 23, 2003

(86) PCT No.: PCT/US03/12520

§ 371 (c)(1),
(2), (4) Date: Nov. 6, 2003

(87) PCT Pub. No.: WO03/091008

PCT Pub. Date: Nov. 6, 2003

Related U.S. Application Data
(60) Provisional application No. 60/374,879, filed on Apr. 23, 2002.

(51) Int. Cl.
*B32B 27/04* (2006.01)
*H02G 3/00* (2006.01)

(52) U.S. Cl. .................. 428/300.7; 174/102 R; 174/70 R; 174/106 R; 174/113 C; 428/297.4; 428/299.1; 428/300.4; 428/299.4; 428/298.1

(58) Field of Classification Search ............... None
See application file for complete search history.

(56) References Cited

U.S. PATENT DOCUMENTS

| 2,625,498 A | 1/1953 | Koch |
| 3,599,679 A | 8/1971 | Carter |
| 4,097,686 A | 6/1978 | Gladenbeck et al. |
| 4,127,741 A | 11/1978 | Bauer et al. |
| 4,195,141 A | 3/1980 | Buning et al. |

(Continued)

FOREIGN PATENT DOCUMENTS

| EP | 0189846 A2 | 8/1986 |
| EP | 0346499 | 12/1989 |
| EP | 0814355 | 12/1997 |
| JP | 59-48148 A | 3/1984 |
| JP | 03129606 | 6/1991 |

(Continued)

OTHER PUBLICATIONS

International Searching Authority, International Preliminary Examination Report, PCT/US03/12520.

(Continued)

*Primary Examiner*—Stephen J Stein

(57) ABSTRACT

This invention relates to an aluminum conductor composite core reinforced cable (ACCC) and method of manufacture. An ACCC cable having a composite core surrounded by at least one layer of aluminum conductor. The composite core comprises at least one longitudinally oriented substantially continuous reinforced fiber type in a thermosetting resin matrix having an operating temperature capability within the range of about 90 to about 230° C., at least 50% fiber volume fraction, a tensile strength in the range of about 160 to about 240 Ksi, a modulus of elasticity in the range of about 7 to about 30 Msi and a thermal expansion coefficient in the range of about 0 to about $6 \times 10^{-6}$ m/m/C. According to the invention, a B-stage forming process may be used to form the composite core at improved speeds over pultrusion processes wherein the speeds ranges from about 9 ft/min to about 50 ft/min.

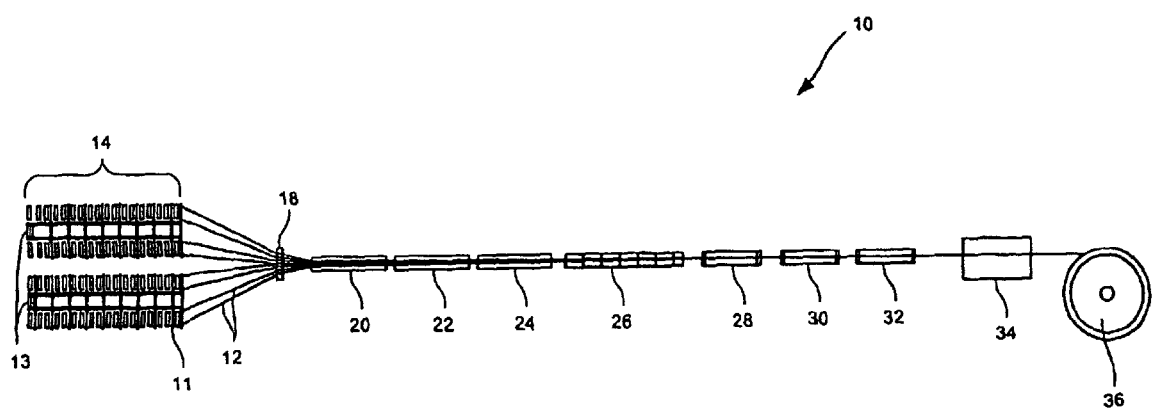

U.S. PATENT DOCUMENTS

| | | | |
|---|---|---|---|
| 4,247,436 | A | 1/1981 | Buning et al. |
| 4,422,718 | A | 12/1983 | Nakagome et al. |
| 4,441,787 | A | 4/1984 | Lichtenberger |
| 4,515,435 | A | 5/1985 | Anderson |
| 4,620,401 | A | 11/1986 | L'Esperance et al. |
| 4,690,497 | A | 9/1987 | Occhini et al. |
| 4,793,685 | A | 12/1988 | Taylor et al. |
| 4,966,434 | A | 10/1990 | Yonechi et al. |
| 5,068,142 | A | 11/1991 | Nose et al. |
| 5,082,397 | A | 1/1992 | Raviv |
| 5,093,162 | A | 3/1992 | Fenton et al. |
| 5,198,173 | A | 3/1993 | Terzian et al. |
| RE34,516 | E | 1/1994 | Houghton |
| 5,296,456 | A | 3/1994 | Shiga et al. |
| 5,304,619 | A | 4/1994 | Yokoyama et al. |
| 5,437,899 | A | 8/1995 | Quigley |
| 5,451,355 | A | 9/1995 | Boissonnat et al. |
| 5,626,700 | A | 5/1997 | Kaiser |
| 5,734,770 | A | 3/1998 | Carpenter et al. |
| 5,808,239 | A | 9/1998 | Olsson |
| 6,007,655 | A | 12/1999 | Gorthala et al. |
| 6,015,953 | A | 1/2000 | Tosaka et al. |
| 6,070,378 | A | 6/2000 | Dumlao et al. |
| 6,329,056 | B1 | 12/2001 | Deve et al. |
| 6,343,172 | B1 | 1/2002 | Schiestle et al. |
| 6,363,192 | B1 | 3/2002 | Spooner |
| 6,800,164 | B2 | 10/2004 | Brandstrom |
| 6,861,131 | B2 | 3/2005 | Evans |
| 7,015,395 | B2 | 3/2006 | Goldsworthy et al. |
| 7,041,909 | B2 | 5/2006 | Hiel et al. |
| 7,060,326 | B2 | 6/2006 | Hiel et al. |
| 7,179,522 | B2 | 2/2007 | Hiel et al. |
| 7,438,971 | B2 | 10/2008 | Bryant et al. |
| 2002/0088549 | A1 | 7/2002 | Fanucci et al. |
| 2004/0009338 | A1 | 1/2004 | Jo et al. |
| 2004/0182597 | A1 | 9/2004 | Smith et al. |
| 2006/0016616 | A1 | 1/2006 | Goldsworthy et al. |
| 2007/0128435 | A1 | 6/2007 | Hiel et al. |
| 2008/0233380 | A1 | 9/2008 | Hiel et al. |

FOREIGN PATENT DOCUMENTS

| | | |
|---|---|---|
| RU | 2210797 | 8/2003 |
| SU | 1817167 | 5/1993 |
| WO | 9534838 | 12/1995 |
| WO | 0206549 | 1/2002 |
| WO | 0206550 | 1/2002 |
| WO | 0207170 | 1/2002 |
| WO | 03050825 | 6/2003 |

OTHER PUBLICATIONS

International Search Report and Written Opinion, PCT/US04/35201.

AGY, "Advanced Materials Solutions for Demanding Applications", Pub. No. LIT–2004–341 (Mar. 2004), www.agy.com web print.

AGY, "Glassfiber Reference Guide", 1999, Pub. No. LIT–99021 (Jul. 1999), www.agy.com web print.

Sato et al., "Development of Aluminum Conductor Carbon Fiber Reinforced", Showa Electric Wire and Cable Review, (2002), p. 54–5, vol. 52, No. 1, Japan.

Prepared by Heil, Clem, prepared for California Energy Commission Consultant Report entitled "Development of a Composite Reinforced Aluminum Conductor," Dated Nov. 2000.

US 7,368,162 C1

1
EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 29-36 is confirmed.

Claims 1, 11, 20 and 27 are determined to be patentable as amended.

Claims 2-10, 12-19, 21-26 and 28, dependent on an amended claim, are determined to be patentable.

New claims 37-83 are added and determined to be patentable.

1. A composite core for an electrical cable comprising:
   an inner core comprising a plurality of substantially continuous reinforcing fibers of at least a first type, the first fiber type having a tensile strength that exceeds the tensile strength of glass fibers;
   an outer core comprising a plurality of substantially continuous reinforcing fibers of at least a second type, the second fiber type having a tensile strength of or similar to glass fibers; and
   a resin matrix, wherein the fibers of the inner and the outer cores are embedded therein;
   wherein, the fibers of the inner core are different from the fibers of the outer core, and wherein the fibers of the inner and the outer cores are oriented substantially parallel to the longitudinal axis *and wherein the composite core is adapted for use as a strength member in an electrical cable.*

11. A composite core for an electrical cable comprising:
    a plurality of reinforcing fibers in a thermosetting resin matrix to form the core, said core having at least 50% fiber volume fraction, the plurality of reinforcing fibers consisting of two or more different types of fibers, a first fiber type having a modulus of elasticity in the range of about 22 (151 GPa) to 37 Msi (255 GPa) and a tensile strength *of* at least about 350 Ksi (2413 MPa) and a second fiber type having a modulus of elasticity in the range of about 6 Msi to about 11.2 Msi and a tensile strength of at least about 180 Ksi (1241 MPa);
    wherein, the fibers are arranged within the resin matrix having the higher tensile strength fibers in the center of the core, *and wherein the composite core is adapted for use as a strength member in an electrical cable.*

20. A composite core for an electrical cable comprising:
    an inner core consisting of a plurality of substantially continuous reinforcing fibers, the fibers having a tensile strength that exceeds the tensile strength of glass fibers;
    an outer core surrounding the inner core consisting at least in part of a plurality of substantially continuous reinforcing glass fibers; and

2
a cured resin matrix, wherein the fibers of the inner and the outer cores are embedded therein;
wherein, the fibers of the inner and the outer cores are oriented substantially parallel to the longitudinal axis, *and wherein the composite core is adapted for use as a strength member in an electrical cable.*

27. A composite core for an electrical cable comprising:
    an inner core comprising a plurality of reinforcing carbon fibers and at least a portion of a plurality of reinforcing fibers having a tensile strength in excess of glass fibers;
    an outer core surrounding the inner core comprising a plurality of glass fibers; and
    a cured resin matrix, wherein the fibers of the inner and the outer cores are embedded therein;
    wherein, the fibers of the inner and outer cores are oriented substantially parallel to the longitudinal axis, *and wherein the composite core is adapted for use as a strength member in an electrical cable.*

*37. A composite core as claimed in claim 1, wherein the outer core is nonconductive and insulates the inner core.*

*38. A composite core as claimed in claim 1, wherein the composite core is fabricated by pulling a plurality of substantially continuous fiber tows through a composite core processing system.*

*39. A composite core as claimed in claim 1, wherein the composite core has a tensile strength above 160 Ksi.*

*40. A composite core as claimed in claim 1, wherein the composite core has a modulus of elasticity within the range of about 7 Msi (48 GPa) to about 30 Msi (206 GPa).*

*41. A composite core as claimed in claim 1, wherein the composite core has a coefficient of thermal expansion in the range of about $0 \times 10^{-6}$ to about $6 \times 10^{-6}$ m/m/° C.*

*42. A composite core as claimed in claim 1, wherein the inner core comprises uniformly distributed and substantially parallel fibers.*

*43. A composite core as claimed in claim 1, wherein the composite core has a length of at least about 6000 feet.*

*44. A composite core as claimed in claim 11, wherein the second fiber type is non-conductive and surrounds and insulates the fibers of the first type.*

*45. A composite core as claimed in claim 11, wherein the composite core has a tensile strength of at least about 160 ksi (1103 MPa).*

*46. A composite core as claimed in claim 11, wherein the composite core has a modulus of elasticity in the range of at least about 7 Msi (48 GPa) to about 30 Msi (206 GPa).*

*47. A composite core as claimed in claim 11, wherein the higher tensile strength fibers in the center of the core comprise a plurality of substantially continuous reinforcing fiber tows.*

*48. A composite core as claimed in claim 11, wherein the reinforcing fibers of a second type comprise a plurality of substantially continuous reinforcing fiber tows.*

*49. A composite core as claimed in claim 11, wherein the reinforcing fibers of the first type are substantially continuous reinforcing fibers that are compacted to form an inner core.*

*50. A composite core as claimed in claim 11, wherein the composite core is fabricated by pulling a plurality of substantially continuous fiber tows through a composite core processing system.*

*51. A composite core as claimed in claim 20, wherein the outer core is non-conductive and insulates the inner core.*

*52. A composite core as claimed in claim 20, wherein the composite core is fabricated by pulling a plurality of substantially continuous fiber tows through a composite core processing system.*

53. A composite core as claimed in claim 20, wherein the composite core has a tensile strength above 160 Ksi (1103 MPa).

54. A composite core as claimed in claim 20, wherein the composite core has a modulus of elasticity within the range of about 7 Msi (48 GPa) to about 30 Msi (206 GPa).

55. A composite core as claimed in claim 20, wherein the composite core has a coefficient of thermal expansion of from about $0 \times 10^{-6}$ to about $6 \times 10^{-6}$ m/m/°C.

56. A composite core as claimed in claim 20, wherein the inner core comprises uniformly distributed and substantially parallel fibers.

57. A composite core as claimed in claim 20, wherein the composite core has a length of at least about 6000 feet.

58. An electrical cable as claimed in claim 29, wherein the outer core is non-conductive and insulates the inner core.

59. An electrical cable as claimed in claim 29, wherein the composite core has a tensile strength above 160 Ksi (1103 MPa).

60. An electrical cable as claimed in claim 29, wherein the composite core has a modulus of elasticity within the range of about 7 Msi (48 GPa) to about 30 Msi (206 GPa).

61. An electrical cable as claimed in claim 29, wherein the composite core has coefficient of thermal expansion of from about $0 \times 10^{-6}$ to about $6 \times 10^{-6}$ m/m/° C.

62. An electrical cable as claimed in claim 29, wherein the composite core has a length of at least about 6000 feet.

63. A method of transmitting electrical power as claimed in claim 36, wherein the fibers of the inner core are carbon fibers.

64. A method of transmitting electrical power as claimed in claim 36, wherein the fibers of the outer core are glass fibers.

65. A method of transmitting electrical power as claimed in claim 36, wherein the outer core is nonconductive and insulates the inner core.

66. A method of transmitting electrical power as claimed in claim 36, wherein the composite core has a tensile strength above 160 Ksi (1103 MPa).

67. A method of transmitting electrical power as claimed in claim 36, wherein the composite core has a modulus of elasticity within the range of about 7 Msi (48 GPa) to about 30 Msi (206 GPa).

68. A method of transmitting electrical power as claimed in claim 36, wherein the composite core has coefficient of thermal expansion of from about $0 \times 10^{-6}$ to about $6 \times 10^{-6}$ m/m/° C.

69. A method of transmitting electrical power as claimed in claim 36, wherein the composite core has a length of at least about 6000 feet.

70. An electrical cable, comprising:
a composite core strength member, the composite core strength member comprising:
a plurality of reinforcing fibers in a thermosetting resin matrix to form the core, said core having at least 50% fiber volume fraction, the plurality of reinforcing fibers consisting of two or more different types of fibers, a first fiber type having a modulus of elasticity in the range of about 22 (151 GPa) to 37 Msi (255 GPa) and a tensile strength of at least about 350 Ksi (2413 MPa) and a second fiber type having a modulus of elasticity in the range of about 6 Msi to about 11.2 Msi and a tensile strength of at least about 180 Ksi (1241 MPa); wherein, the fibers are arranged within the resin matrix having the higher tensile strength fibers in the center of the core;
at least one layer of conductor surrounding said composite core.

71. An electrical cable as claimed in claim 70, wherein the composite core has a tensile strength above 160 Ksi (1103 MPa).

72. An electrical cable as claimed in claim 70, wherein the composite core has a modulus of elasticity within the range of about 7 Msi (48 GPa) to about 30 Msi (206 GPa).

73. An electrical cable as claimed in claim 70, wherein the composite core has a length of at least about 6000 feet.

74. An electrical cable as claimed in claim 70, wherein the at least one layer of conductor comprises an aluminum conductor.

75. An electrical cable as claimed in claim 70, wherein the at least one layer of conductor comprises a plurality of trapezoidal shaped aluminum strands.

76. An electrical cable as claimed in claim 70, wherein the first reinforcing fiber type is carbon.

77. An electrical cable as claimed in claim 76, wherein the second reinforcing fiber type is glass.

78. An electrical cable as claimed in claim 70, wherein the first fiber type forms an inner core and the second fiber type forms an outer core that surrounds the inner core.

79. An electrical cable as claimed in claim 78, wherein the outer core is non-conductive and insulates the inner core.

80. A composite core strength member for an electrical cable, comprising:
a plurality of reinforcing fibers in a thermosetting resin matrix to form the composite core strength member, said composite core strength member having at least 50% fiber volume fraction, the plurality of reinforcing fibers consisting of two or more different types of fibers, a first fiber type having a modulus of elasticity in the range of about 22 (151 GPa) to 37 Msi (255 GPa) and a tensile strength of at least about 350 Ksi (2413 MPa) and a second fiber type having a modulus of elasticity in the range of about 6 Msi to about 11.2 Msi and a tensile strength of at least about 180 Ksi (1241 MPa); wherein, the fibers are arranged within the resin matrix having the higher tensile strength fibers in the center of the core, and
wherein the composite core strength member is adapted for use as a strength member in an electrical cable, and wherein the outside diameter of the composite core strength member is smaller than that of a steel core having the same tensile strength as the composite core strength member thereby allowing the composite core strength member to be wound with an increased volume of conductive material without changing the outside diameter of the electrical cable, thereby providing increased ampacity thereover.

81. A composite core as claimed in claim 80, wherein the first reinforcing fiber type is carbon and the second reinforcing fiber type is glass.

82. A composite core as claimed in claim 81, wherein the composite core strength member has a modulus of elasticity within the range of about 7 Msi (48 GPa) to about 30 Msi (206 GPa).

83. A composite core as claimed in claim 82, wherein the composite core strength member has a tensile strength above 160 Ksi (1103 MPa).

* * * * *

(12) EX PARTE REEXAMINATION CERTIFICATE (9008th)
United States Patent
Hiel et al.

(10) Number: US 7,368,162 C2
(45) Certificate Issued: May 8, 2012

(54) ALUMINUM CONDUCTOR COMPOSITE CORE REINFORCED CABLE AND METHOD OF MANUFACTURE

(75) Inventors: Clem Hiel, Rancho Palos Verdes, CA (US); George Korzlenowski, Woodland Hills, CA (US)

(73) Assignee: Partners for Growth II, L.P., San Francisco, CA (US)

Reexamination Request:
No. 90/011,740, Jun. 13, 2011

Reexamination Certificate for:
Patent No.: 7,368,162
Issued: May 6, 2008
Appl. No.: 10/511,881
Filed: Oct. 19, 2004

Reexamination Certificate C1 7,368,162 issued Jun. 8, 2010

Certificate of Correction issued Jun. 8, 2010.

(22) PCT Filed: Apr. 23, 2003
(86) PCT No.: PCT/US03/12520
§ 371 (c)(1), (2), (4) Date: Nov. 6, 2003
(87) PCT Pub. No.: WO03/091008
PCT Pub. Date: Nov. 6, 2003

Related U.S. Application Data
(60) Provisional application No. 60/374,879, filed on Apr. 23, 2002.

(51) Int. Cl.
*B32B 27/04* (2006.01)
*H02G 3/00* (2006.01)

(52) U.S. Cl. .................. 428/300.7; 174/102 R; 174/70 R; 174/106 R; 174/113 C; 428/297.4; 428/298.1; 428/299.1; 428/299.4; 428/300.4

(58) Field of Classification Search .................. None
See application file for complete search history.

(56) References Cited

To view the complete listing of prior art documents cited during the proceeding for Reexamination Control Number 90/011,740, please refer to the USPTO's public Patent Application Information Retrieval (PAIR) system under the Display References tab.

*Primary Examiner* — Norca L Torres Velazquez

(57) ABSTRACT

This invention relates to an aluminum conductor composite core reinforced cable (ACCC) and method of manufacture. An ACCC cable having a composite core surrounded by at least one layer of aluminum conductor. The composite core comprises at least one longitudinally oriented substantially continuous reinforced fiber type in a thermosetting resin matrix having an operating temperature capability within the range of about 90 to about 230° C., at least 50% fiber volume fraction, a tensile strength in the range of about 160 to about 240 Ksi, a modulus of elasticity in the range of about 7 to about 30 Msi and a thermal expansion coefficient in the range of about 0 to about 6×10⁻⁶ m/m/C. According to the invention, a B-stage forming process may be used to form the composite core at improved speeds over pultrusion processes wherein the speeds ranges from about 9 ft/min to about 50 ft/min.

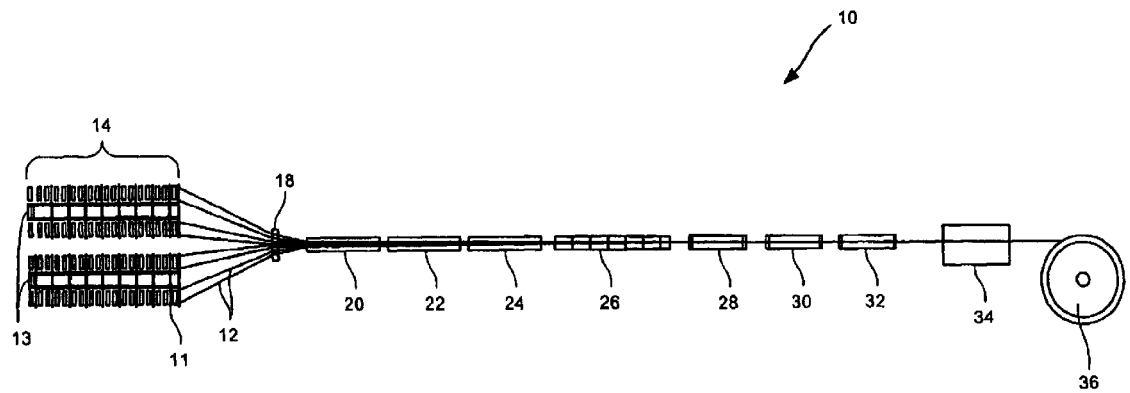

US 7,368,162 C2

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11, 20, 27, 29-36, 58-62 and 70-80 are determined to be patentable as amended.

Claims 2-10, 12-19, 21-26, 28, 37-57, 63-69 and 81-83, dependent on an amended claim, are determined to be patentable.

1. A composite core for an *overhead* electrical cable comprising:
   an inner core comprising a plurality of substantially continuous reinforcing fibers of at least a first type, the first fiber type having a tensile strength that exceeds the tensile strength of glass fibers;
   an outer core comprising a plurality of substantially continuous reinforcing fibers of at least a second type, the second fiber type having a tensile strength of or similar to glass fibers; and
   a resin matrix, wherein the fibers of the inner and the outer cores are embedded therein;
   wherein, the fibers of the inner core are different from the fibers of the outer core, and wherein the fibers of the inner and the outer cores are oriented substantially parallel to the longitudinal axis and wherein the composite core is adapted for use as a strength member in an *overhead* electrical cable.

11. A composite core for an *overhead* electrical cable comprising:
   a plurality of reinforcing fibers in a thermosetting resin matrix to form the core, said core having at least 50% fiber volume fraction, the plurality of reinforcing fibers consisting of two or more different types of fibers, a first fiber type having a modulus of elasticity in the range of about 22 (151 GPa) to 37 Msi (255 GPa) and a tensile strength of at least about 350 Ksi (2413 MPa) and a second fiber type having a modulus of elasticity in the range of about 6 Msi to about 11.2 Msi and a tensile strength of at least about 180 Ksi (1241 MPa); wherein, the fibers are arranged within the resin matrix having the higher tensile strength fibers in the center of the core, and wherein the composite core is adapted for use as a strength member in an *overhead* electrical cable.

20. A composite core for an *overhead* electrical cable comprising:
   an inner core consisting of a plurality of substantially continuous reinforcing fibers, the fibers having a tensile strength that exceeds the tensile strength of glass fibers;
   an outer core surrounding the inner core consisting at least in part of a plurality of substantially continuous reinforcing glass fibers; and
   a cured resin matrix, wherein the fibers of the inner and the outer cores are embedded therein;
   wherein, the fibers of the inner and the outer cores are oriented substantially parallel to the longitudinal axis, and wherein the composite core is adapted for use as a strength member in an *overhead* electrical cable.

27. A composite core for an *overhead* electrical cable comprising:
   an inner core comprising a plurality of reinforcing carbon fibers and at least a portion of a plurality of reinforcing fibers having a tensile strength in excess of glass fibers;
   an outer core surrounding the inner core comprising a plurality of glass fibers; and
   a cured resin matrix, wherein the fibers of the inner and the outer cores are embedded therein;
   wherein, the fibers of the inner and outer cores are oriented substantially parallel to the longitudinal axis, and wherein the composite core is adapted for use as a strength in an *overhead* electrical cable.

29. An *overhead* electrical cable comprising:
   a composite core further comprising:
      an inner core comprising a plurality of substantially continuous reinforcing fibers of at least a first type, the first type having a tensile strength that exceeds the tensile strength of glass fibers, wherein the fibers are substantially parallel to the longitudinal axis;
      an outer core comprising a plurality of substantially continuous reinforcing fibers of at least a second type, the second type having a tensile strength of or similar to glass fibers, wherein the fibers are substantially parallel to the longitudinal axis; and
      a cured resin matrix, wherein the fibers of the inner and the outer cores are embedded therein; and
      at least one layer of conductor surrounding said outer core.

30. An *overhead* electrical cable as claimed in claim 29 wherein, the composite material of the inner core and the outer core is selected to meet physical characteristics in the end composite core including a tensile strength of at least 160 Ksi (1103 MPa), a modulus of elasticity in the range of at least about 7 Msi (48 GPa) to about 30 Msi (206 GPa), an operating temperature in the range of about 90 to about 230° C. and a thermal expansion coefficient at least in the range of about 0 to about $6 \times 10^{-6}$ m/m/° C.

31. An *overhead* electrical cable as claimed in claim 29 wherein, the composite core comprises a fiber/resin volume fraction in the range of at least about 50%.

32. An *overhead* electrical cable as claimed in claim 29 wherein, the composite core comprises a fiber/resin ratio of at least about 62% by weight.

33. An *overhead* electrical cable as claimed in claim 29 wherein, the fibers of the inner core are carbon and the fibers of the outer core are glass.

34. An *overhead* electrical cable as claimed in claim 29 wherein, the conductor surrounding the core comprises a plurality of aluminum sigments.

35. An *overhead* electrical cable as set forth in claim 29 wherein, the compsoite core is sgemented.

36. A method of transmitting electrical power comprising:
   using [a] *an overhead* cable comprising a composite core and at least one layer of aluminum conductor surrounding the composite core, the composite core further comprising:
      an inner core comprising a plurality of substantially continuous reinforcing fibers of at least a first type, the first type having a tensile strength that exceeds the tensile strength of glass fibers, wherein the fibers are substantially parallel to the longitudinal axis;
an outer core comprising a plurality of substantially continuous reinforcing fibers of at least a second type, the second type having a tensile strength of or similar to glass fibers, wherein the fibers are substantially parallel to the longitudinal axis; and
a cured resin matrix, wherein the fibers of the inner and the outer cores are embedded therein; and
transmitting power across the *overhead* composite cable.

58. An *overhead* electrical cable as claimed in claim 29, wherein the outer core is non-conductive and insulates the inner core.

59. An *overhead* electrical cable as claimed in claim 29, wherein the composite core has a tensile strength about 160 Ksi (1103 MPa).

60. An *overhead* electrical cable as claimed in claim 29, wherein the composite core has a modulus of elasticity within the range of about 7 Msi (48 GPa) to about 30 Msi (206 GPa).

61. An *overhead* electrical cable as claimed in claim 29, wherein the composite core has coefficient of thermal expansion of from about $0 \times 10^{-6}$ to about $6 \times 10^{-6}$ m/m/°C.

62. An *overhead* electrical cable as claimed in claim 29 wherein the composite core has a length of at least about 6000 feet.

70. An *overhead* electrical cable, comprising:
a composite core strength member, the composite core strength member comprising:
a plurality of reinforcing fibers in a thermosetting resin matrix to form the core, said core having at least 50% fiber volume fraction, the plurality of reinforcing fibers consisting of two or more different types of fibers, a first fiber type having a modulus of elasticity in the range of about 22 (151 GPa) to 37 Msi (255 GPa) and a tensile strength of at least about 350 Ksi (2413 MPa) and a second fiber type having a modulus of elasticity in the range of about 6 Msi to about 11.2 Msi and a tensile strength of at least about 180 Ksi (1241 MPa); wherein, the fibers are arranged within the resin matrix having the higher tensile strength fibers in the center of the core;
at least one layer of conductor surrounding said composite core.

71. An *overhead* electrical cable as claimed in claim 70, wherein the composite core has a tensile strength above 160 Ksi (1103 MPa).

72. An *overhead* electrical cable as claimed in claim 70, wherein the composite core has a modulus of elasticity within the range of about 7 Msi (48 GPa) to about 30 Msi (206 GPa).

73. An *overhead* electrical cable as claimed in claim 70, wherein the composite core has a length of at least about 6000 feet.

74. An *overhead* electrical cable as claimed in claim 70, wherein the at least one layer of conductor comprises an aluminum conductor.

75. An *overhead* electrical cable as claimed in claim 70, wherein the at least one layer of conductor comprises a plurality of trapezoidal shaped aluminum strands.

76. An *overhead* electrical cable as claimed in claim 70, wherein the first reinforcing fiber type is carbon.

77. An *overhead* electrical cable as claimed in claim 76, wherein the second reinforcing fiber type is glass.

78. An *overhead* electrical cable as claimed in claim 70, wherein the first fiber type forms an inner core and the second fiber type forms an outer core that surrounds the inner core.

79. An *overhead* electrical cable as claimed in claim 78, wherein the outer core is non-conductive and insulates the inner core.

80. A composite core strength member for an *overhead* electrical cable, comprising:
a plurality of reinforcing fibers in a thermosetting resin matrix to form the composite core strength member, said composite core strength member having at least 50% fiber volume fraction, the plurality of reinforcing fibers consisting of two or more different types of fibers, a first fiber type having a modulus of elasticity in the range of about 22 (151 GPa) to 37 Msi (255 GPa) and a tensile strength of at least about 350 Ksi (2413 MPa) and a second fiber type having a modulus of elasticity in the range of about 6 Msi to about 11.2 Msi and a tensile strength of at least about 180 Ksi (1241 MPa); wherein,the fibers are arranged within the resin matrix having the higher tensile strength fibers in the center of the core, and
wherein the composite core strength member is adapted for use as a strength member in an *overhead* electrical cable, and wherein the outside diameter of the composite core strength member is smaller than that of a steel core having the same tensile strength as the composite core strength member thereby allowing the composite core strength member to be wound with an increased volume of conductive material without changing the outside diameter of the *overhead* electrical cable, thereby providing increased ampacity thereover.

* * * * *